US011589251B2

(12) United States Patent
Futaki

(10) Patent No.: US 11,589,251 B2
(45) Date of Patent: Feb. 21, 2023

(54) RADIO COMMUNICATION SYSTEM, RADIO STATION, RADIO TERMINAL, NETWORK OPERATION MANAGEMENT APPARATUS, AND COMMUNICATION QUALITY CONFIRMATION METHOD

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/373,330

(22) PCT Filed: Jan. 17, 2013

(86) PCT No.: PCT/JP2013/050760
§ 371 (c)(1),
(2) Date: Jul. 18, 2014

(87) PCT Pub. No.: WO2013/108819
PCT Pub. Date: Jul. 25, 2013

(65) Prior Publication Data
US 2014/0357297 A1 Dec. 4, 2014

(30) Foreign Application Priority Data
Jan. 19, 2012 (JP) .............................. JP2012-009486

(51) Int. Cl.
H04W 64/00 (2009.01)
H04W 24/10 (2009.01)
(Continued)

(52) U.S. Cl.
CPC ......... H04W 24/10 (2013.01); H04L 43/0888 (2013.01); H04W 64/00 (2013.01);
(Continued)

(58) Field of Classification Search
CPC ..... H04W 24/10; H04W 4/025; H04W 24/08; H04W 64/00; H04L 43/0888; H04L 41/12; H04L 41/5067
See application file for complete search history.

(56) References Cited

U.S. PATENT DOCUMENTS

2004/0176108 A1* 9/2004 Misikangas ........... H04W 64/00
455/456.5
2010/0311415 A1* 12/2010 Hamabe .............. H04W 64/003
455/425
(Continued)

FOREIGN PATENT DOCUMENTS

CN 101420736 A 4/2009
CN 101645818 A 2/2010
(Continued)

OTHER PUBLICATIONS

3GPP TSG-RAN WG2 Meeting #76 , Nov. 2011, 3gpp.org.*
(Continued)

Primary Examiner — Said M Elnoubi

(57) ABSTRACT

The present invention is a radio communication system having quality measurement means configured to execute quality measurement related to a service quality in communication between a radio terminal and a radio station, and information collection means configured to collect information related to a location of the radio terminal to be a target for the quality measurement, the radio communication system comprising: means configured to associate the information related to the location of the radio terminal when a predetermined condition is satisfied in an execution period of the quality measurement with results of the quality measurement.

16 Claims, 15 Drawing Sheets

(51) Int. Cl.
| | |
|---|---|
| *H04L 43/0888* | (2022.01) |
| *H04W 24/08* | (2009.01) |
| *H04L 41/5067* | (2022.01) |
| *H04W 4/02* | (2018.01) |
| *H04L 41/12* | (2022.01) |

(52) U.S. Cl.
CPC .......... *H04L 41/12* (2013.01); *H04L 41/5067* (2013.01); *H04W 4/025* (2013.01); *H04W 24/08* (2013.01)

(56) References Cited

U.S. PATENT DOCUMENTS

| | | | |
|---|---|---|---|
| 2011/0051616 | A1* | 3/2011 | Inada .................. H04L 25/0204 370/252 |
| 2012/0315890 | A1* | 12/2012 | Suzuki ................. H04W 24/10 455/422.1 |

FOREIGN PATENT DOCUMENTS

| | | |
|---|---|---|
| CN | 101822089 A | 9/2010 |
| CN | 102223657 A | 10/2011 |
| CN | 102231894 A | 11/2011 |
| EP | 2200352 A1 | 6/2010 |
| EP | 2360962 A2 | 8/2011 |
| JP | 2008-312223 A | 12/2008 |
| JP | 2010-041656 A | 2/2010 |
| JP | 2011-238990 A | 11/2011 |
| JP | 2013-70318 A | 4/2013 |
| JP | 2015502092 A | 1/2015 |
| WO | WO-2009-011065 A | 1/2009 |
| WO | WO-2009-048088 A1 | 4/2009 |
| WO | WO-2009/060935 A1 | 5/2009 |
| WO | WO 2011097730 A1 * | 8/2011 ............ H04W 24/10 |
| WO | WO-2013/108819 A1 | 7/2013 |
| WO | WO-2016/013647 A1 | 1/2016 |

OTHER PUBLICATIONS

3GPP TSG-RAN2#77, "Location Information for QoS Measurements," Dresen, Germany, Feb. 6-10, 2012.*
3GPP TSG-RAN WG2 Meeting #76., Nov. 2011.*
3GPP TSG-RAN WG2 Meeting #76, LG Electronics ,"Throughput and loss rate measurements for MDT QoS verification", Nov. 14-18, 2011, 3GPP .(Year: 2011).*
3GPP TSG-RAN WG2 Meeting #76, Nov. 2011, 3GPP. (Year: 2011).*
3GPP TSG-RAN WG2 Meeting #67 R2-095780, Ericson, NW based solution for QoS verification, 2009, 3GPP (Year: 2009).*
3GPP TSG-RAN WG2 Meeting #76 R2-116247, LG Electronics Inc. Throughput and loss rate measurements for MDT QoS verification ,2011, 3GPP . (Year: 2011).*
3GPP TSG-RAN WG2 Meeting #67 R2-095780, NW based solution for QoS verification, Oct. 11-16, 2009, 3GPP.org (Year: 2009).*
3GPP TSG-RAN WG2 Meeting #67, R2-116247, Throughput and loss rate measurements for MDT QoS verification, Nov. 14-18, 2011, 3GPP.org (Year: 2011).*
3GPP "3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall description; Stage 2 (Release 10)", 3GPP TS 37.320, V10.4.0, Dec. 24, 2011, 18 pages.
CATT "Location Information for QoS Verification", 3GPP TSG RAN WG2 Meeting #75bis, R2-115102, Zhuhai, China, Oct. 10-14, 2011, 2 pages.
Ericsson et al. "NW Based Solution for QoS Verification", 3GPP TSG-RAN WG2 #67bis, R2-095780; Miyazaki, Japan, Oct. 11-16, 2009, 2 pages.

Extended European Search Report corresponding to European Application No. 13738774.2, dated Sep. 29, 2015, 18 pages.
Huawei "MDT Location Control and Correlation" 3GPP TSG-RAN WG2 #70bis, R2-104674, Madrid, Spain, Aug. 23-27, 2010, 8 pages.
LG Electronics Inc. "Discussion on Coverage Map and QoS", 3GPP TSG-RAN WG2 #76, R2-116064, Nov. 14-18, 2011, San Francisco, USA, 3 pages.
LG Electronics Inc. "Throughput and Loss Rate Measurements for MDT QoS Verification" 3GPP TSG-RAN WG2 Meeting #76, R2-116247, San Francisco, USA, Nov. 14-18, 2011, 3 pages.
Telecom Italia "Use Case for QoS Verification" 3GPP TSG-RAN WG2 #67, R2-094572, Shenzhen (China), Aug. 24-28, 2009, 6 pages.
Japanese Office Action Issued by the Japanese Patent Office for Application No. 2013-554327 dated Sep. 17, 2014 along with partial English translation (7 pages).
Japanese Office Action issued in corresponding Japanese Patent Application No. 2014-261046, dated Aug. 17, 2016, 3 pages.
Kyocera "QoS Measurement and Location Association for MDT", 3GPP TSG-RAN WG2 #76, R2-115949, San Francisco, USA, Nov. 14-18, 2011, 3 pages.
Nokia Siemens Networks, Nokia Corporation "Considerations on MDT QoS Verification", 3GPP TSG-RAN WG2 Meeting #75bis, R2-114928, Zhuhai, China, Oct. 10-14, 2011, 5 pages.
NTT Docomo, Inc. "Location Information for QoS Measurements", 3GPP TSG-RAN2 #77, R2-120356, Feb. 6-10, 2012, Dresden, Germany, 5 pages.
International Search Report, Corresponding to PCT/JP2013/050760, dated Feb. 12, 2013, 2 pages.
3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; State 2 (Release 10), 3GPP TS37.320v10.30 (Internet<URL>http:www.3gpp.org/ftp/Specs/html-info/37320.htm), Sep. 2011, 17 pages.
3rd Generation Partnership Project; Technical Specification Group Services and System Aspects; Telecommunication management; Subscriber and equipment trace; Trace control and configuration management (Release 10), 3GPP T332.422v10.5.0 (Internet<URL>http:www.3gpp.org/ftp/Specs/html-info/32422.htm), Sep. 2011, 117 pages.
3rd Generation Partnership Project; Technical Specification Group Radio Access Network; Evolved Universal Terrestrial Radio Access (E-UTRA): Radio Resource Control (RRC); Protocol specification (Release 10), 3GPP TS36.331v10.3.0 (Internet<URL>http:www.3gpp.org/ftp/Specs/html-info/36331.htm), (Sep. 2011), 296 pages.
China Notification of First Office Action issued in corresponding Chinese Patent Application No. 201380006168.7, dated Mar. 27, 2017, 22 pages.
Huawei "MDT Location Control and Correlation", 3GPP TSG-RAN WG2 #70bis, R2-103778, Stockholm, Sweden, Jun. 28-Jul. 2, 2010, 7 pages.
China Notification of the Second Office Action issued in Chinese Patent Application No. 201380006168.7, dated Nov. 16, 2017, 18 pages.
Chinese Office Action issued by the State Intellectual Property Office of the People's Republic of China for Chinese Application No. 201380006168.7 dated Jun. 11, 2018 (18 pages).
3rd Generation Partnership Project; Technical Specification Group Services and System Aspects; Telecommunication management; Subscriber and equipment trace; Trace control and configuration managment (Release 11), 3GPP TS 32.422, V11.1.0, 117 pages (Sep. 2011).
Brazil Office Action issued by the Brazil Patent Office for Brazil Application No. BR112014015665-4 dated Mar. 26, 2018 (7 pages).
Japanese Office Action issued in Japanese Patent Application No. 2018-107006, dated Feb. 27, 2019, 6 pages.
NTT DOCOMO, Inc., MediaTek, Vodafone, CMCC, "Requirements, Priority and Solution for MDT Location Information Enhancement", 3GPP TSG-RAN WG2 Meeting #76 R2-116135, [online],

(56) References Cited

OTHER PUBLICATIONS

Nov. 8, 2011, pp. 1-6, URL, https://www.3gpp.org/ftp/tsg_ran/WG2_RL2/TSGR2_76/Docs/R2-116135.zip.

Counterpart Japanese Office Action (with English machine translation) dated Jun. 17, 2020 in corresponding Japanese Patent Application No. 2019-109320.

China Unicom, "Consideration on QoS verification for MDT", 3GPP Draft; R2-115736 Consideration on QoS Verification for MDT, 3rd Generation Partnership Project (3GPP), Mobile Competence Centre; 650, Route Des Lucioles; F-06921 Sophia-Antipolis Cedex; France, vol. Ran WG2, No. San Francisco, CA; Nov. 14, 2011-Nov. 18, 2011, Nov. 4, 2011, XP050563951, (retrieved on Nov. 4, 2011).

Chinese Office Action for CN Application No. 2019100937.9 dated Sep. 27, 2021 with English Translation.

MediaTek, "Introduction of MDT enhancements", 3GPP TSG-RAN WG2 Meeting #76, R2-116518, Nov. 18, 2011, USA, pp. 1-14.

\* cited by examiner ial Cell Identity: PCI or,
RADIO COMMUNICATION SYSTEM, RADIO STATION, RADIO TERMINAL, NETWORK OPERATION MANAGEMENT APPARATUS, AND COMMUNICATION QUALITY CONFIRMATION METHOD

CROSS-REFERENCE TO RELATED APPLICATIONS

The present application is a national stage application of International Application No. PCT/JP2013/050760 entitled "Wireless Communication System, Wireless Station, Wireless Terminal, Network Operation Management Device, And Communication Quality Confirmation Method," filed on Jan. 17, 2013, which claims the benefit of priority from Japanese Patent Application No. JP2012-009486, filed on Jan. 19, 2012, the disclosures of which are incorporated herein in their entirety by reference thereto.

TECHNICAL FIELD

The present invention relates to a radio communication system that a radio station has function to instruct a radio terminal to obtain collect measurement information, and a function to collect the measurement information.

BACKGROUND ART

In the 3GPP (3rd Generation Partnership Project), in order to reduce operation expense (OPEX) incurred in a drive-test by an operator, utilization of a radio terminal for measurement and report of information that has been collected by the drive-test or information similar thereto is under study (Non Patent Literature 1). An ultimate object of the above-mentioned study is the minimization of execution of the drive-tests, and the technology related to this study is collectively called "MDT" (Minimization of Drive-Tests). An application target of MDT is both UMTS (Universal Mobile Telecommunication System) and LTE (Long Term Evolution), which are cellular systems defined in 3GPP. The term "measurement" herein also includes "detecting" a certain specific situation.

In MDT, the following two methods are defined as a method for obtaining and reporting measurement information by a radio terminal.

1. Immediate MDT: The method that instructs a radio terminal to obtain and report measurement information in an active state. It is also abbreviated as "IMM MDT"

2. Logged MDT: The method that instructs a radio terminal to obtain measurement information in an idle state, and report the obtained measurement information in an active state. It is also abbreviated to as "LOG MDT".

In the study of MDT, making a determination which radio terminal is instructed to obtain and report measurement information in the network side, that is, control of obtaining and reporting measurement information by a radio terminal initiated by the network is a basic principle, and the following two methods are defined in Non Patent Literature 2.

A. Management based MDT: The method that firstly specifies an area to be a target for collection of measurement information in MDT, and then selects any radio terminal from radio terminals staying in the area. It is also called as Area based MDT.

B. Signaling based MDT: The method that selects a specific radio terminal based on an individual identifier (Identity: ID) of the radio terminal.

Hereinafter, as an example of MDT defined in 3GPP, management-based Immediate MDT will be described with reference to FIG. 15. A LTE system assumed herein includes a radio terminal UE (User Equipment: UE), a radio base station (evolved NodeB: eNB), a mobility management apparatus (Mobility Management Entity: MME)/a home subscriber management server (Home Subscriber Server: HSS) of a radio terminal, a network operation management apparatus (Element Manager: EM), and an information collection server (Trace Collection Entity: TCE). Hereinafter, each step of the management-based Immediate MDT will be described.

Step 1) The EM notifies an eNB of a MDT Activation message including configuration information (MDT measurement configuration) measured by a radio terminal (UE) of MDT, target location information of MDT (Area Scope), trace basic information (TR: Trace Reference, TRSR: Trace Recording Session Reference) and the like, as information necessary for executing the management-based Immediate MDT.

Step 2) The eNB confirms a user agreement (User Consent) with respect to a report of location information of the UE belonging to the eNB (User consent information retrieval) with an Evolved Packet Core (EPC) (In particular, HSS). Note that such confirmation by the User consent is performed through each interface from the eNB to the MME, and from the MME to the HSS, but in FIG. 15, it is described as an interface (or message) from the eNB to the EPC (MME/HSS), instead of sequentially indicating an interface (or message) between the eNB and the MME, and an interface (or message) between the MME and the HSS. Also, in FIG. 15, a user agrees (Consent) and it is assumed to select the UE of the user as UE to be instructed the Immediate MDT.

Step 3) The eNB starts a trace session (Starting Trace Session) for collecting UE measurement information of MDT, and transmits configuration information measured by the UE for the Immediate MDT to the UE (Measurement configuration (IMM MDT)). Here, the configuration information includes, for example, a measurement target and a measurement period, or instructions to report location information.

Step 4) The UE executes measurement at an instructed period and reports the measurement results and location information to the eNB.

Step 5) The eNB notifies the EPC (MME) of an identifier of the trace session (that is, TR or TRSR) after collecting (or, in the process of collecting) the UE measurement information of a predetermined MDT.

Step 6) The EPC (MME) reports corresponding type information of the UE (TAC: Type Allocation Code) and an identifier (that is, TR or TRSR) to the TCE.

Step 7) The eNB reports to the TCE, a trace record that records the collected UE measurement information of MDT.

Here, the measurement information obtained by a radio terminal is a cell ID (Physical Cell Identity: PCI or, E-UTRAN Cell Global Identity: ECGI) of a cell where the radio terminal stays, or of a neighboring cell, received power (RS Received Power: RSRP) of reference signals (Reference Signal: RS) which are downlink known signals transmitted in each cell (Non-Patent Literature 3). The information including a cell ID and the received power may also be called as "RF Fingerprint". Further, in the case of Logged MDT, a radio terminal also stores time information (relative time from absolute time that is notified when receiving configuration of Logged MDT) upon storing the results of the measurement information.

Further, when a radio terminal obtains detailed location information with no relation to MDT while obtaining measurement information, the radio terminal also stores the detailed location information therewith and reports such information to a radio base station. The detailed location information is for example location information obtained with a GNSS (Global Navigation Satellite System) typified by a GPS (Global Positioning System), or location information obtained with a location information service (Location Service: LCS) by a network.

Using the terminal measurement of MDT as described above, it is possible to perform coverage mapping that indicates received quality of a target area on the network side, without a manual drive test (or with reduction of executing a drive test). In particular, it is possible to perform the coverage mapping more accurately in the case that a report accompanied by detailed location information increases. Further, it is expected to realize a self-optimization of coverage which is studied in SON (Self-Organizing Network), based on the coverage mapping.

CITATION LIST

Non-Patent Literature

[Non Patent Literature 1]
3GPP TS37.320v10.3.0
(Internet<URL>http:www.3gpp.org/ftp/Specs/html-info/37320.htm)
[Non Patent Literature 2]
3GPP TS32.422v10.5.0
(Internet<URL>http:www.3gpp.org/ftp/Specs/html-info/32422.htm)
[Non Patent Literature 3]
3GPP TS36.331v10.3.0
(Internet<URL>http:www.3gpp.org/ftp/Specs/html-info/36331.htm)

SUMMARY OF INVENTION

Technical Problem

Analysis of the related art by the present invention is described below.

In MDT defined in 3GPP listed as the related art, measurement results of a radio terminal and measured location information are corresponded one-to-one. That is, on the network side (e.g. TCE), it is possible to easily understand at which point the measurement results are measured.

Here, in MDT, consider a case that quality measurement related to communication quality, which is called as a QoS (Quality of Service), between a radio station (e.g. radio base station eNB or base station control station RNC) and a radio terminal is performed. Note that, it is conceivable that a subject to execute the quality measurement is a radio station, or a radio terminal, the case in which the radio station performs will be described as an example. When the radio station executes quality measurement related to a communication quality with one radio terminal, it is important which location the UE is staying with the quality. In some cases, as to a location where the radio terminal stays, the information on a cell level may be enough, that is, the information as to which cell the radio terminal stays, but in other cases, the information on a more detailed level may be necessary, that is, the information as to where the radio terminal stays in a cell. As described above, there is a purpose of using the MDT as an alternative for a drive test, so that it is required to collect location information at a more detailed level than a cell level. Therefore, when executing the quality measurement related to the QoS in the MDT, it is necessary to collect the location information at a more detailed level than a cell level.

At present, although it is not defined how quality measurement related to the QoS is performed in the MDT, consider that it is assumed to use the Immediate MDT described above. Firstly, a radio station gives instructions of the Immediate MDT to a radio terminal, for example, instructions to execute periodical measurement of received quality (e.g. RSRP or RSRQ) and obtain location information, and to report the measurement results of the received quality and the location information. In accordance with the instructions, the radio terminal periodically reports the measurement results of the received quality and the obtained location information to the radio station. At this time, the radio station executes quality measurement of communication between the radio station and the radio terminal in parallel with the Immediate MDT. Note that, as an example of the quality measurement, throughput measurement is conceivable. Then, the radio station reports each of UE measurement information collected in Immediate MDT (that is, measurement results of received quality and location information) and the quality measurement results (e.g. throughput) to the information collection server (TCE) of MDT, independently. It is conceivable to assume values at a time point where the radio terminal stayed, using the quality measurement results (e.g. throughput) and the location information of the radio terminal which is collected at a time point that is close to a time point where the quality measurement results were obtained. For example, a distribution map (mapping) indicating how much throughput is obtained in the whereabouts of a cell is generated, based on the collected throughput and location information.

However, as in the above-described method, when executing the quality measurement related to the QoS such as throughput and collection of the location information by the Immediate MDT independently, the TCE cannot precisely determine the quality measurement as to where a radio terminal actually stayed, because it takes a period of time (from several seconds to several minutes) to execute the quality measurement related to the QoS such as throughput.

In such a case, only with the location information when a radio terminal moves in a period of the quality measurement and the measurement results are obtained (e.g. predetermined calculation is finished), a problem is caused that it is difficult to make effective use of the results of the quality measurement. For example, in mapping generation of throughput described above, a mapping accuracy is inferior to what it is expected. This becomes more of a problem as a period of the quality measurement is longer, or a moving speed of a radio terminal is faster. For example, when a radio terminal with 30 kilometers per hour performs communication for 30 seconds, the distance that the radio terminal moves in a period of throughput measurement is about 240 meters. Also, when a rapidly moving radio terminal with 100 kilometers per hour performs communication for 20 seconds, the movement distance is about 550 meters. Taking into consideration that an accuracy of GPS location information is from several meters to several ten meters, it is impossible to think that the radio terminal stays in almost the same location in the mapping of throughput Further, this problem causes a large influence in multi-vendor environments in which a plurality of radio stations by different vendors are mixed within the same radio communication system. That is, when the radio stations for each vendor executes quality measurement and collects location information at any time point in their unique way, it is difficult for the TCE to perform calculations, taking the differences in each vendor into consideration.

Therefore, the problem to be solved in the present invention is that when executing quality measurement related to a service quality (e.g. QoS) in MDT, it is necessary to provide a method for associating results of the quality measurement with location information of a radio terminal to be a target for the quality measurement.

Solution to Problem

The present invention is a radio communication system having quality measurement means configured to execute quality measurement related to a service quality in communication between a radio terminal and a radio station, and information collection means configured to collect information related to a location of the radio terminal to be a target for the quality measurement, the radio communication system comprising: means configured to associate the information related to the location of the radio terminal when a predetermined condition is satisfied in an execution period of the quality measurement with results of the quality measurement.

The present invention is a radio terminal in a radio communication system that executes quality measurement related to a service quality in communication between the radio terminal and a radio station, the radio terminal comprising: location information report means configured to obtain information related to the radio terminal when a predetermined condition is satisfied in an execution period of the quality measurement and report the obtained information related to the location to the radio station.

The present invention is a radio station in a radio communication system that executes quality measurement related to a service quality in communication between a radio terminal and the radio station, the radio station comprising: means configured to instruct the radio terminal to be a target for the quality measurement to obtain one or more than one information related to a location when a predetermined condition is satisfied; and means configured to associate the information related to the location of the radio terminal with results of the quality measurement.

The present invention is a network operation management apparatus in a radio communication system that executes quality measurement related to a service quality in communication between a radio terminal and a radio station, the network operation management apparatus comprising: means configured to instruct the radio station to execute the quality measurement; instruct the radio terminal to be a target for the quality measurement to obtain one or more than one information related to a location when a predetermined condition is satisfied, in an execution period of the quality measurement; and transmit the information related to the location of the radio terminal in association with results of the quality measurement.

The present invention is a communication quality confirmation method, comprising: executing quality measurement related to a service quality in communication between a radio terminal and a radio station; obtaining information related to a location of the radio terminal when a predetermined condition is satisfied; and associating the information related to the location of the radio terminal when the predetermined condition is satisfied with results of the quality measurement.

Advantageous Effect of Invention

According to the present invention, in a network apparatus such as the TCE, as to the results of quality measurement related to a QoS collected in MDT, it is possible to easily understand where a radio terminal stays at a time point the results are available, thereby being able to effectively confirm whether a desired QoS is achieved.

DESCRIPTION OF EMBODIMENTS

<Description of Configuration>

Figure 1:
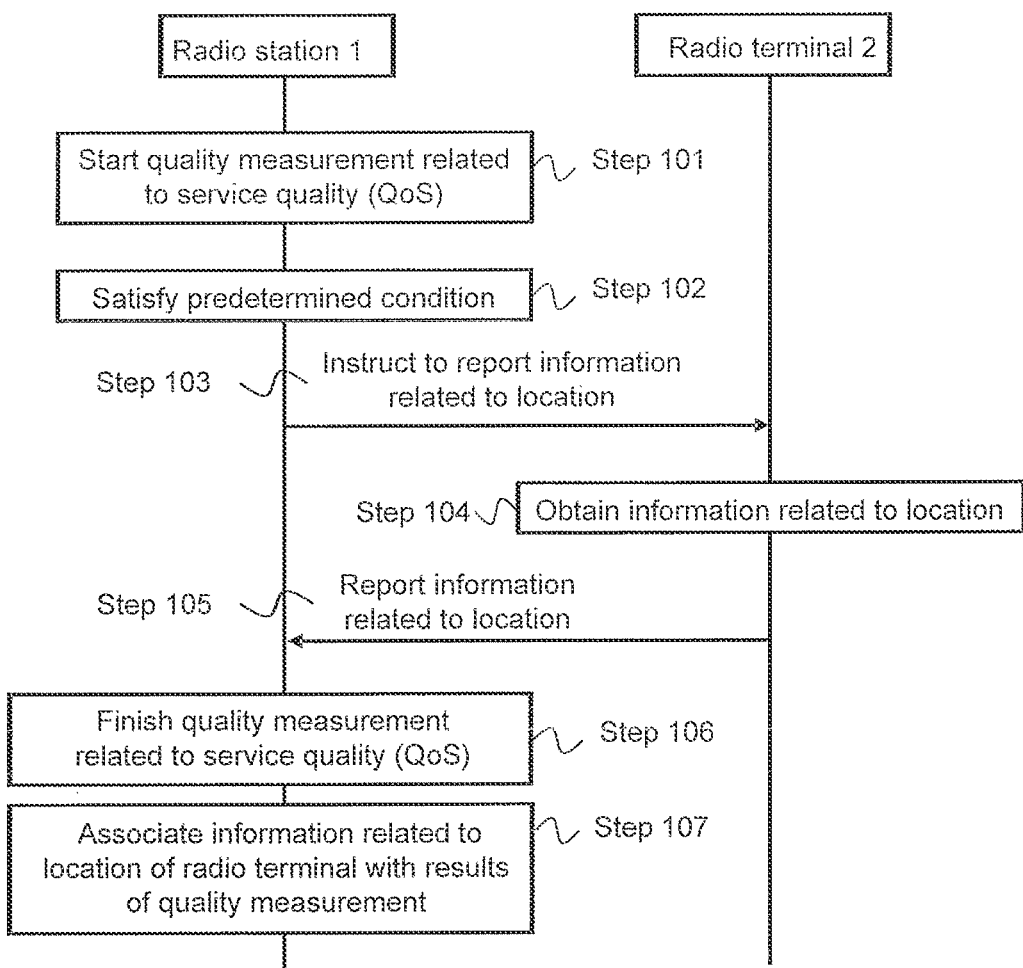
FIG. 1 is a sequence diagram illustrating operations of a radio station and a radio terminal in accordance with a first embodiment of the present invention.

Embodiments of the present invention will be described in detail with reference to the drawings, using an example of a radio communication system including radio stations (e.g. radio base station and base station control station) and radio terminals as a configuration element.

In one embodiment of the present invention, a radio station or a radio terminal has a function to execute quality measurement related to a service quality in communication between the radio station and the radio terminal, the radio station has a function to instruct the radio terminal to obtain and report information related to a location (location related information) of the radio terminal, and the radio terminal has a function to obtain information related to a location of the radio terminal and report it to the radio station. Note that the service quality is also called as QoS (Quality of Service). In such a radio communication system, the radio station associates information related to a location of the radio terminal when a predetermined condition is satisfied with results of quality measurement, in an execution period of the quality measurement related to the service quality (e.g. QoS). As means for realizing this, the radio station instructs the radio terminal to be a target for the quality measurement related to the service quality (e.g. QoS) to obtain one or more than one information related to a location of the radio terminal when a predetermined condition is satisfied in an execution period of the quality measurement and to report the information related to the location, and associates the information related to the location collected from the radio terminal with the results of the quality measurement. Note that, as an association method, for example, the information related to the location collected from the radio terminal and the results of the quality measurement may be a pair of information, or the information related to the location collected from the radio terminal may be associated with the results of the quality measurement by associating each of the information related to the location collected from the radio terminal and the results of the quality measurement with identification information of the radio terminal.

Here, it is conceivable that "information related to a location (location related information)" is, for example, detailed location information obtained with GNSS (Global Navigation Satellite System) typified by GPS (Global Positioning System), detailed location information that is obtained, based on an arrival timing difference of signals from a plurality of radio stations in one radio terminal, known as OTDOA (Observed Time Difference Of Arrival), and received power (or received quality) of downlink signals (e.g. pilot signals and reference signals) of an staying area (e.g. cell) and a neighboring area (e.g. cell) of the radio terminal, and an identifier of the area, but it is not limited thereto. Note that, it is conceivable that a radio terminal reports an accuracy of detailed location information (that is, positioning accuracy) together with the detailed location information. Meanwhile, it is conceivable that quality measurement related to the service quality is performed by either a radio station, or a radio terminal.

Further, it is conceivable that "a period of quality measurement" is, for example, from the start to the end of quality measurement, from a preparation period before the start of quality measurement to the end thereof, from the start of quality measurement to a post-processing period after the end thereof, and from a preparation period before start of quality measurement to a post-processing period after the end thereof, but it is not limited thereto. Note that a post-processing period after the end of quality measurement indicates a period that is required until a radio terminal obtains information related to a location after the end of quality measurement, for example, in the case that the end of the quality measurement is a predetermined condition. Here, it is conceivable that an example of quality measurement related to a service quality (e.g. QoS) is, for example, throughput measurement, a packet loss rate, a packet discard rate, a packet (or transport block) error rate, a packet (or transport block) retransmission rate, a call setup delay, and a handover delay, but it is not limited thereto. Here, it is conceivable that a call setup delay is a time from after confirmation of a first access (or, after completion of a first access process) until completion of each network establishment, when one radio terminal performs a radio link establishment, or a network connection establishment with a radio station. Further, it is conceivable that a handover delay is a time from a time point at which a radio terminal performs a measurement report for handover until completion of handover. Note that, it is conceivable that completion of handover is until a radio terminal completes handover, or until a source radio station is notified of information, from a target radio station, indicating that handover of the radio terminal is completed.

On the other hand, it is conceivable that "information related to a location of a radio terminal when a predetermined condition is satisfied" is, for example, information related to a location that is stored by a radio terminal when a radio station gives instructions to the radio terminal when deciding whether a predetermined condition is satisfied and when the radio terminal receives the instructions from the radio station, information related to a location that is obtained (or in the middle of obtainment) by a radio terminal when a radio station gives instructions to the radio terminal when deciding whether a predetermined condition is satisfied and when the radio terminal receives the instructions from the radio station, information related to a location that is stored by a radio terminal when a radio terminal decides that a predetermined condition is satisfied, and information related to a location that is obtained (or in the middle of obtainment) by a radio terminal when a radio terminal decides whether a predetermined condition is satisfied, but it is not limited thereto.

Further, it is conceivable that "predetermined condition" is, for example, the start or the end (at least either of them) of quality measurement related to a service quality (e.g. QoS), the start and the end of quality measurement related to a service quality (e.g. QoS), a predetermined period, detailed location information by GPS or OTDOA is obtained (or updated), a trigger for handover is initiated, a call disconnection (also referred to as Radio Link Failure: RLF) occurs, and received quality of a serving cell (that is, a stay cell) is changed by a predetermined amount, but it is not limited thereto.

Here, when using "the start or the end of quality measurement" as a condition, it is possible to make clear correspondence between information related to a location of a radio terminal and results of quality measurement by deciding as a rule that the information related to the location of the radio terminal at, at least, either a start point or an end point is collected. Further, when using "the start and the end of quality measurement" as a condition, it is possible to obtain information such as how much a radio terminal moves, or how much received quality changes during a period of quality measurement, in addition to making clear correspondence between the information related to a location of a radio terminal and the results of quality measurement.

Here, it is conceivable that "the start of quality measurement" is, for example, the start of a session to be a target for quality measurement, the transmission of first data in a session to be a target for quality measurement, the reception of first data in a session to be a target for quality measurement, a time point that data belonging to a predetermined QoS (or, QoS group, QCI: Qos Class Indicator) in a session to be a target for quality measurement is generated, and the transmission of data belonging to a predetermined QoS (or, QoS group, QCI) in a session to be a target for quality measurement, but it is not limited thereto.

Further, it is conceivable that "the end of quality measurement" is, for example, the end of a session to be a target for quality measurement, the decision of end of a session to be a target for quality measurement, the transmission of last data in a session to be a target for quality measurement, the reception of last data in a session to be a target for quality measurement, the completion of transmitting last data in a session to be a target for quality measurement, the completion of receiving last data in a session to be a target for quality measurement, and a time point that data belonging to a predetermined QoS (or, QoS group, QCI) in a session to be a target for quality measurement is empty but it is not limited thereto.

On the other hand, when using "predetermined period" as a condition, it is conceivable that a radio terminal periodically obtains information related to a location from the start of quality measurement. Therefore, when a radio terminal moves greatly during a period of quality measurement, or when the received quality fluctuates greatly, it is possible to understand a detailed movement path or a fluctuation state of the received quality.

Further, "a trigger for handover is initiated," is, for example, to satisfy a preliminary indicated condition related to a measurement report of received quality, or to receive or transmit handover instructions. Therefore, even when the quality measurement is disrupted due to handover to be performed by a radio terminal during a period of the quality measurement, that is, in the middle of the quality measurement, it is possible to collect the results of quality measurement up to a time point of the handover (that is, interim results), or information related to a location at the time point of the handover, Further, not only a single predetermined condition is used, but a plurality of predetermined conditions can also be used. For example, a predetermined condition to be judged in a radio station and another predetermined condition to be decided in a radio terminal may be used in combination, or a plurality of predetermined conditions may be used in combination in the radio station, or the radio terminal.

Here, as a method for the use of collected information related to a location, when collecting information related to locations at a plurality of time points, for example, at the start and the end of quality measurement, it is conceivable that such information is processed by linear interpolation to estimate a point where a radio terminal stays, and associated quality measurement results are mapped to the point where the radio terminal stays. On the other hand, when collecting only information related to a location at a predetermined time point, it is conceivable that the associated quality measurement results are mapped to the point where the radio terminal stays at the predetermined time point. However, a method for the use of the collected information related to a location is not limited thereto, but various usage embodiments are possible.

Figure 2:
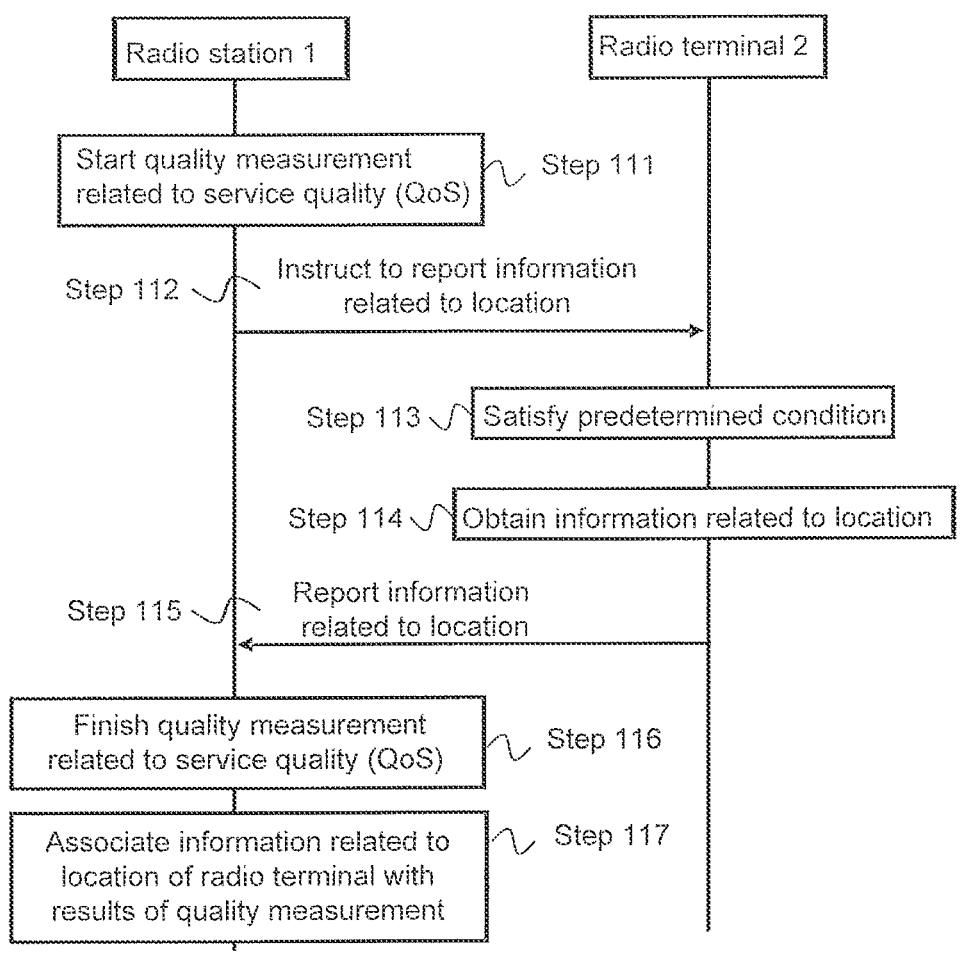
FIG. 2 is a sequence diagram illustrating operations of a radio station and a radio terminal in accordance with the first embodiment of the present invention.
Figure 3:
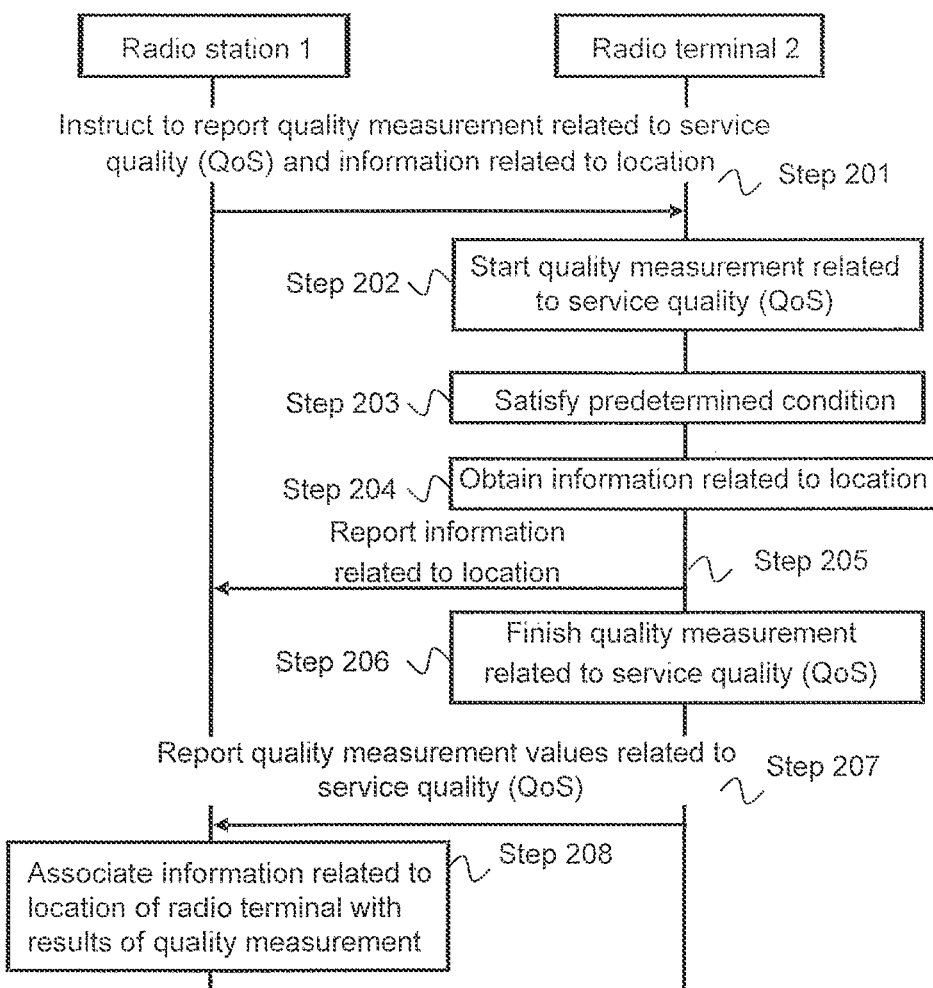
FIG. 3 is a sequence diagram illustrating operations of a radio station and a radio terminal in accordance with a second embodiment of the present invention.
Figure 4:
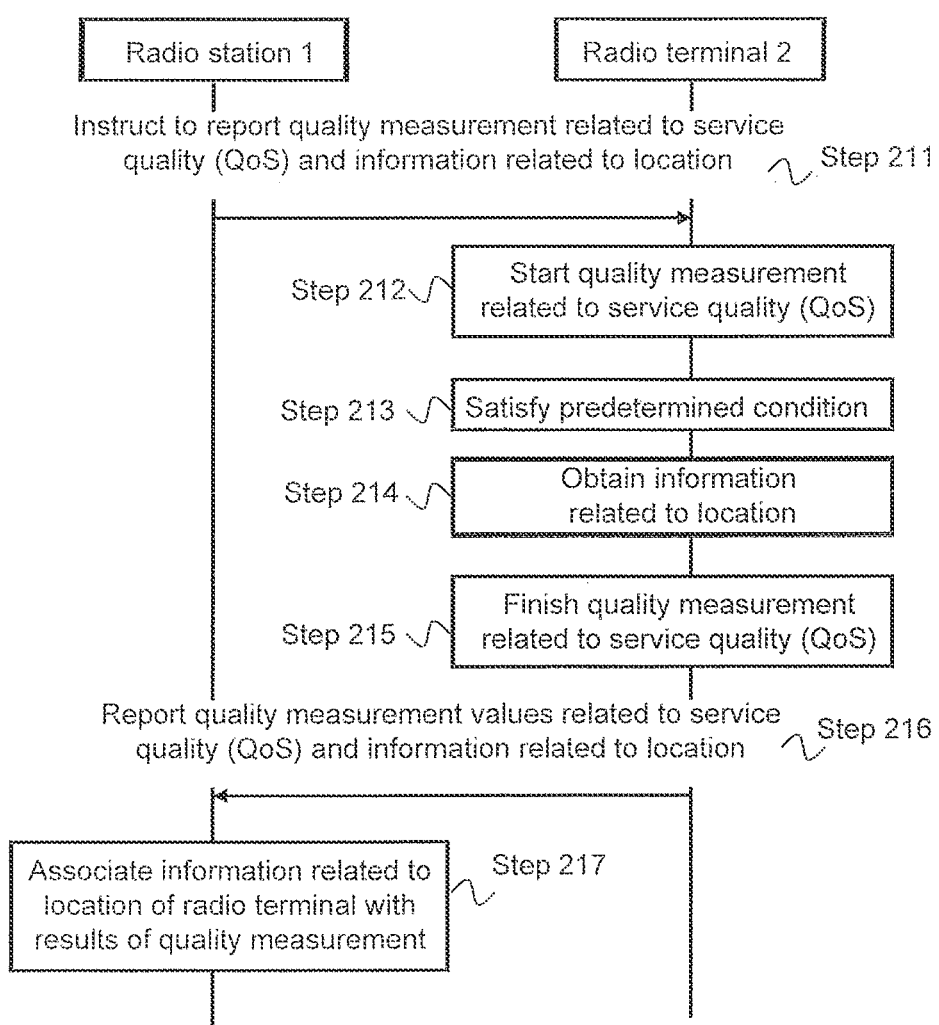
FIG. 4 is a sequence diagram illustrating operations of a radio station and a radio terminal in accordance with the second embodiment of the present invention.

FIGS. 1 to 4 are sequence diagrams illustrating basic operations of a radio station and a radio terminal in a radio communication system of the present invention. Here, FIG. 1 and FIG. 2 show an example that a radio station executes quality measurement related to a service quality (e.g. QoS), and FIG. 3 and FIG. 4 show an example that a radio terminal executes the quality measurement.

First Embodiment

In FIG. 1, by performing the following steps, a radio station 1 collects information related to a location from a radio terminal 2, when executing quality measurement related to a service quality (e.g. QoS). Firstly, the radio station 1 starts the quality measurement related to the service quality (e.g. QoS) for the radio terminal 2 (Step 101). The radio station 1 decides whether a predetermined condition is satisfied, and when the radio station 1 decides that the predetermined condition is satisfied at a time point (Step 102), the radio station 1 instructs the radio terminal 2 to report the information related to the location (Step 103). When receiving the instructions, the radio terminal 2 obtains the information related to the location (Step 104) and reports the information related to the location obtained at a predetermined timing to the radio station 1 (Step 105). Here, a predetermined timing may be notified from the radio station 1 when instructing the radio terminal 2 to report the information related to the location, or it may be preliminarily notified to the radio terminal 2. Then, the radio station 1 finishes the quality measurement related to the service quality (Step 106). The radio station 1 associates the information related to the location of the radio terminal when a predetermined condition is satisfied in a period of the quality measurement related to the service quality with the results of the quality measurement (Step 107).

Similarly, In FIG. 2, by performing the following steps, the radio station 1 collects information related to a location from the radio terminal when executing quality measurement related to a service quality (e.g. QoS). The difference from FIG. 1 lies in that the radio terminal 2 decides whether a predetermined condition is satisfied. Firstly, the radio station 1 starts quality measurement related to the service quality (e.g. QoS) for the radio terminal 2 (Step 111). The radio station 1 instructs the radio terminal 2 to report information related to the location (Step 112). A predetermined condition may be notified at this time, or it may preliminarily be notified to the radio terminal 2. Further, a predetermined condition may preliminarily be defined in the specification. The radio terminal 2 decides whether the predetermined condition is satisfied, and when the radio terminal 2 decides that the predetermined condition is satisfied at a time point (Step 113), the radio terminal 2 obtains the information related to the location (Step 114). Then, the radio terminal 2 reports the information related to the location to the radio station 1 at a predetermined timing (Step 115). Here, a predetermined timing may be notified from the radio station when instructing the radio terminal 2 to report the information related to the location, or it may be preliminarily notified to the radio terminal 2. Then, then, the radio station 1 finishes the quality measurement related to the service quality (Step 116). The radio station 1 associates the information related to the location of the radio terminal when a predetermined condition is satisfied in a period of the quality measurement related to the service quality with the results of the quality measurement (Step 117).

Here, when the quality measurement related the service quality (e.g. QoS) is finished, the radio station 1 associates the results of the quality measurement with the information related to the location collected from the radio terminal 2. "Association" herein means, for example, storing of the results of quality measurement and information related to a location by generating one information element (e.g. it may be referred to as QoS Information Element, or as QoS container), or storing of the results of quality measurement and information related to a location by performing association with the use of a predetermined identifier. It is also conceivable that the radio station 1 transmits the information element, or the associated quality measurement results to an information collection server, or an upper network node. Further, the association may be performed before the end of quality measurement, that is, during execution of the quality measurement.

By the above-operations, when a radio station executes quality measurement related to a service quality (e.g. QoS), it is possible to effectively collect information related to a location of the radio terminal to be a target for quality measurement, and to clearly associate the results of the quality measurement with the information related to the location of the radio terminal. Further, this enables an information collection server, which has collected the results of the quality measurement and the information related to the location of the radio terminal from the radio station, to understand which results of the quality measurement are the results as to where (that is, which location) the radio terminal stayed, thereby being able to use such information effectively.

Second Embodiment

Next, an example in which a radio terminal executes quality measurement will be described.

In FIG. 3, by performing the following steps, the radio station 1 collects the results of quality measurement related to a service quality (e.g. QoS) and information related to a location from the radio terminal 2. Firstly, the radio station 1 instructs the radio terminal 2 to execute quality measurement related to the service quality (e.g. QoS) and report the results of the quality measurement, and obtain and report the information related to the location (Step 201). Note that, it is conceivable that the instructions to execute the quality measurement include information as to what, how, in which timing and in which period the quality measurement is executed. The radio terminal 2 starts the quality measurement related to the service quality (e.g. QoS) (Step 202). Note that, it is conceivable that, as to a start timing for the quality measurement, the timing is instructed from the radio station 1, or it is preliminarily notified to the radio terminal 2, or the quality measurement to be a target (that is, to be executed) is decided by something, in the instructions of the quality measurement (Step 201). The radio terminal 2 decides whether a predetermined condition is satisfied during execution of the quality measurement, and obtains the information related to the location (Step 204) when the predetermined condition is satisfied (Step 203). At a predetermined timing, the radio terminal 2 reports the obtained information related to the location to the radio station 1 (Step 205). Here, a predetermined timing may be notified from the radio station 1 when instructing the radio terminal 2 to report the information related to the location (Step 201), or it may be preliminarily notified to the radio terminal 2. Then, when the radio terminal 2 finishes the quality measurement related to the service quality (Step 206), the radio terminal 2 reports the results of the quality measurement to the radio station (Step 207). The radio station 1 associates the information related to the location of the radio terminal when a predetermined condition is satisfied in a period of the quality measurement related to the service quality with the results of the quality measurement (Step 208).

Similarly, in FIG. 4, by performing the following steps, the radio station 1 collects the results of quality measurement related to the service quality (e.g. QoS) and information related to a location from the radio terminal 2. The difference from FIG. 3 lies in that the radio terminal 2 reports information related to a location together with the results of quality measurement. That is, when obtaining information related to a location (Step S214), the radio terminal 2 stores the information related to the location, and after finishing the quality measurement related to the service quality (Step 215), the radio terminal 2 reports the information related to the location to the radio station 1, together with the results of the quality measurement (Step 216). The radio station 1 associates the information related to the location of the radio terminal when a predetermined condition is satisfied in a period of the quality measurement related to the service quality with the results of the quality measurement (Step 217).

Here, when collecting the results of the quality measurement related to the service quality (e.g. QoS), the radio terminal 1 associates the results of the quality measurement with the information related to the location collected from the radio terminal 2. "Association" herein means, for example, storing of the results of quality measurement and information related to a location by generating one information element (e.g. it may be referred to as QoS information element), or storing of the results of quality measurement and information related to a location by performing association with the use of a predetermined identifier. It is also conceivable that the radio station 1 transmits the information element, or the associated quality measurement results to an information collection server, or an upper network node. Further, the association may be performed before the end of quality measurement, that is, during execution of the quality measurement.

By the above-operations, when the radio station 1 instructs the radio terminal 2 to execute quality measurement related to a service quality (QoS) and report the results of the quality measurement, it is possible to effectively collect information related to a location of the radio terminal 2 to be a target for the quality measurement, and to clearly associate the results of the quality measurement with the information related to the location of the radio terminal. Further, this enables the information collection server, which has collected the results of the quality measurement and the information related to the location of the radio terminal 2 from the radio station 1, to understand which results of the quality measurement are the results as to where (that is, which location) the radio terminal 2 stayed, thereby being able to use such information effectively. Here, an advantage to instruct the radio terminal 2 to decide whether a predetermined condition is satisfied lies in that it is possible to reduce a message for instructing the radio terminal 2 to obtain information related to a location from the radio station 1, or reduce a gap (that is, time difference) between a time point at which a predetermined condition is satisfied and a timing for obtaining information related to a location.

As other examples as to obtaining and reporting of information related to a location of the radio terminal 2 during which the quality measurement related to a service quality (e.g. QoS) is performed, the followings are conceivable as an example:

A radio terminal periodically obtains and reports information related a location;

A radio terminal periodically obtains information related a location, and reports when a predetermined report trigger is initiated;

A radio terminal periodically obtains information related a location, and reports in the case when moving more than a predetermined distance from the time of a previous obtainment or a previous report;

A radio terminal periodically obtains information related a location, and reports in the case when transmitting the predetermined number (or the predetermined amount) of packets (or, data) from the time of a previous obtainment or a previous report;

A radio terminal obtains information related to a location when a predetermined obtainment trigger is initiated, and periodically reports; and A radio terminal obtains information related to a location when a predetermined obtainment trigger is initiated, and reports when a predetermined report trigger is initiated.

Here, an obtainment period and a report period of information related to a location may be the same or different. A predetermined report trigger may preliminarily be notified from the radio station 1 to the radio terminal 2, or it may be notified when the radio terminal 2 receives instructions to report information related to a location from the radio station 1. A predetermined obtainment trigger may preliminarily be notified from the radio station 1 to the radio terminal 2, or it may be notified when the radio terminal 2 receives instructions to obtain information related to a location from the radio station 1. Further, when comparing information related to a location with the time of a previous obtainment or a previous report (e.g. movement distance, or the number of packets), the obtained information related to the location may be reported not until after receiving instructions to obtain and report the information related to the location. Note that these are only examples, so that it is not indispensable to be any of the examples.

With use of one embodiment of the present invention described above, as to the results of quality measurement related to a service quality (e.g. QoS), it is possible to easily understand where a radio terminal stays when the results are available, thereby being able to effectively confirm whether a desired QoS is achieved.

<Embodiment Assuming Radio Communication System of 3GPP>

In the following, an embodiment of the present invention will be described in detail with reference to the drawings, using LTE (Long Term Evolution) or UMTS (Universal Mobile Telecommunication System) which is a radio communication system of 3GPP (3rd Generation Partnership Project) as an example.

In one embodiment of the present invention, a radio station (radio base station eNB of LTE, or base station control station RNC of UMTS or base station NB of UMTS), or a radio terminal has a function to execute quality measurement related to a service quality in communication between the radio station and the radio terminal, the radio station has a function to instruct the radio terminal to obtain and report information related to a location of the radio terminal, and the radio terminal has a function to obtain information related to a location of the radio terminal and report it to the radio station. Note that the service quality is also called as QoS (Quality of Service). In such a radio communication system, the radio station associates information related to a location of the radio terminal when a predetermined condition is satisfied with results of quality measurement, in an execution period of the quality measurement related to the service quality (e.g. QoS). As means for realizing this, the radio station instructs the radio terminal to be a target for quality measurement related to the service quality (e.g. QoS) to obtain one or more than one information related to a location of the radio terminal when a predetermined condition is satisfied in an execution period of the quality measurement and to report the information related to the location, and associates the information related to the location collected from the radio terminal with the results of the quality measurement to transmit to an information collection server. Note that, as an association method, for example, the information related to the location collected from the radio terminal and the results of the quality measurement may be transmitted to the information collection server as a pair of information, or the information related to the location collected from the radio terminal may be associated with the results of the quality measurement by associating each of the information related to the location collected from the radio terminal and the results of the quality measurement with identification information of the radio terminal respectively, and then the information related to the location collected from the radio terminal and the results of the quality measurement may separately be transmitted to the information collection server.

In one embodiment of the present invention, the radio terminal has a function to obtain measurement information specified by the radio station and to report the obtained measurement information to the radio station. In the following, as a method for realizing obtainment and report of measurement information or information related to a location by the radio terminal, it is assumed "to obtain and report measurement information or information related to a location by the radio terminal in "Minimization of Drive Test (MDT)" defined in 3GPP. However, the present invention is not limited thereto. Further, in the following, note that obtainment of measurement information or information related to a location by the radio terminal in MDT is referred to as "MDT measurement", report of MDT measurement and measurement information or information related to a location obtained by the MDT measurement is referred to as "MDT measurement reporting", and logging (storing) of MDT measurement and measurement information or information related to a location obtained by the MDT measurement is referred to as "MDT measurement logging".

Here, it is conceivable that "information related to a location" is, for example, detailed location information obtained with GNSS (Global Navigation Satellite System) typified by GPS, detailed location information obtained with a location information service (Location Service: LCS) such as OTDOA received power (e.g. RSRP, or received quality) of downlink signals (e.g. pilot signal or reference signal) both of a serving cell of a radio terminal and a neighboring cell, and an ID of the cell (e.g. PCI or PSC). The information related to a location by received power (or, received quality) of downlink signals and a cell ID is also called as RF Fingerprint. Note that, it is conceivable that a radio terminal reports an accuracy of detailed location information (that is, positioning accuracy) together with the detailed location information.

Further, in the present invention, when executing quality measurement related to a service quality (QoS), it is also conceivable to take information on a state of a radio network executing the quality measurement into consideration. This is because, when executing the quality measurement for communication between each radio terminal (UE) and a radio station (e.g. eNB or RNC) located in adjacent areas, the meanings are different depending on when and under what circumstances the results are obtained. For example, as to throughput per user in busy hours and throughput per user in off-hours, throughput per user in busy hours tends to be reduced in general. At this time, when deciding quality only with throughput values per user, without taking busy hours or off-hours into consideration, there is a problem that a meaning of the throughput is misinterpreted. It is conceivable that radio network information is, for example, core network load information,
radio access network load information, and
radio bearer related information, but it is not limited thereto. The core network load information refers to the information such as what level EPC (e.g. MME, S-GW) load or Core Network (CN) (e.g. SGSN, GGSN) load is in, or whether it is overloaded. The radio access network load information refers to the information such as what level RAN (e.g. eNB, NB, RNC) load (e.g. radio resource usage rate (Physical Resource Block Usage)), hardware load, network load (Transport Network Layer Load), and available capacity (Composite Available Capacity) are in, or whether it is overloaded, whether an access is limited (Access Barring: AB, or Access Class Barring: ACB), the number of activated radio terminals around cells (Number of Active UE), or the number of random access preambles around cells (Number of Received Random Access Preambles), which is received in a predetermined period. The radio bearer information refers to the information such as how many radio bearers (Radio Bearer: RB) are used per cell, or how many radio access bearers (Radio Access Bearer: RAB) are established per cell. Note that a radio bearer (RB) or a radio access bearer (RAB) may be the information per type such as GBR (Guaranteed Bit Rate), Non-GBR.

Further, it is conceivable to take radio terminal information of each radio terminal UE into consideration. It is conceivable that the radio terminal information is, for example, terminal unique information,
speed related information, and
radio link information, but it is not limited thereto. The terminal unique information refers to the information such as radio terminal capability (UE Capability), radio terminal category (UE Category), access class, or terminal type (e.g. Type Allocation Code: TAC included in International Mobile Equipment Identifier: IMEI that is a terminal identifier). The speed related information refers to the information such as a speed of the radio terminal (UE) measured by the UE itself, a speed of the UE estimated by the radio base station (eNB), a mobility state of the UE decided by the UE itself, or a mobility state of the UE decided by the eNB. Note that a mobility state is the information defined in multiple levels such as Normal, Low, Medium and High, for example, it is decided based on how many times the radio terminal (UE) performs handover within a predetermined time, or how many times the UE performs cell reselections. The radio link information refers to the information such as the number of radio bearers (Number of RB) simultaneously used, the number of cells (Number of Serving Cell) simultaneously used, the number of component carriers (Number of Component Carrier) simultaneously used, or whether a plurality of radio bearers are used, whether a plurality of cells or component carriers are used, or channel quality (Channel Quality Indicator: CQI), or a policy (e.g. Proportional Fairness: PF, Round Robin: RR) in a scheduler of a radio station (e.g. eNB, NB, RNC). Note that a technique for the use of a plurality of cells or component carrier is called as a carrier aggregation in LTE, and the technique is expected to bring an improvement effect of throughput (that is, increase). Similarly, in UMTS, a technique for the use of a plurality of cells is used in combination with the use of HSDPA (High Speed Downlink Packet Access), or HSUPA (High Speed Uplink Packet Access), for example, when two cells are simultaneously used, it is called as dual cell HSDPA, or dual cell HSUPA.

It is expected to make quality measurement more meaningful by adding such radio network information or radio terminal information to the information to be reported to the TCE.

Further, in the present invention, it is conceivable that the radio station forcibly instructs the radio terminal to execute obtainment of detailed location information using GPS or LCS, and to report the detailed location information. Therefore, it is possible to effectively obtain the detailed location information, thereby being able to expect to increase a mapping accuracy with the results of quality measurement. However, in this case, the application of information may be necessary, the information indicating whether a user who owns a radio terminal allows for obtainment of detailed location information (e.g. what is similar to "User Consent" with respect to a report of location information) in accordance with the instructions from a radio station. In this case, the radio station can forcibly instruct the radio terminal to obtain and report the detailed location information only when a user consents. Further, as another method, when the radio terminal receives instructions to forcibly obtain and report the detailed location information from the radio station, the radio terminal may be configured to reject the instructions. It is conceivable as a rejection reason that a user rejects the instructions, or a battery amount of the radio terminal is not sufficient, but it is not limited thereto.

<Embodiment of First Radio Communication System>

Figure 5:
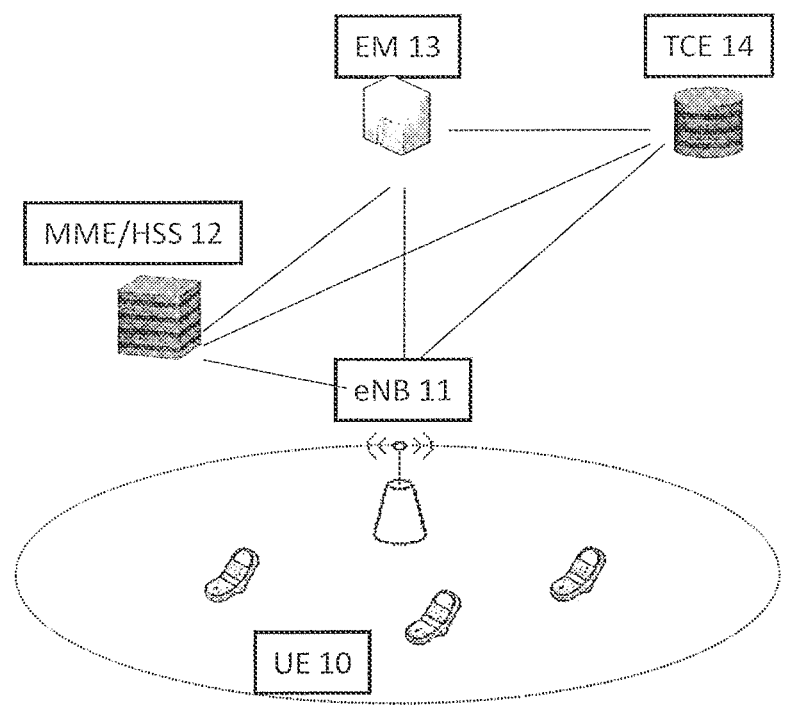
FIG. 5 is a configuration diagram of a first radio communication system applied to the present invention.

FIG. 5 is a diagram illustrating an example of the overall configuration of a first radio communication system in one embodiment of the present invention. The first radio communication system assumes 3GPP LTE is assumed in, and includes a radio terminal (UE) 10, a radio base station (eNB) 11, a mobility management apparatus (MME)/a home subscriber management server (HSS) 12 of a radio terminal, a network operation management apparatus (EM) 13, and an information collection server (Trace Collection Entity: TCE) 14.

Figure 6:
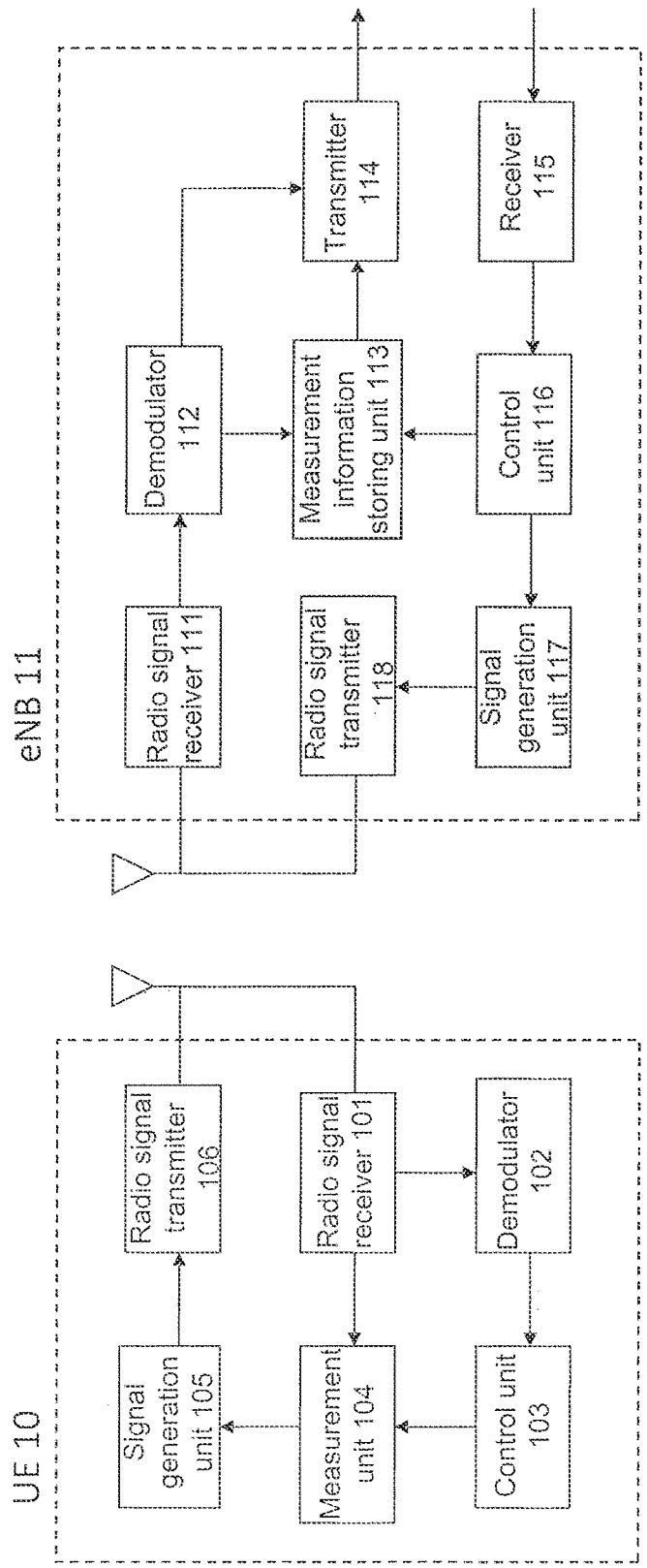
FIG. 6 is a block diagram of a radio terminal (UE) and a radio base station (eNB) in accordance with the first radio communication system.
Figure 7:
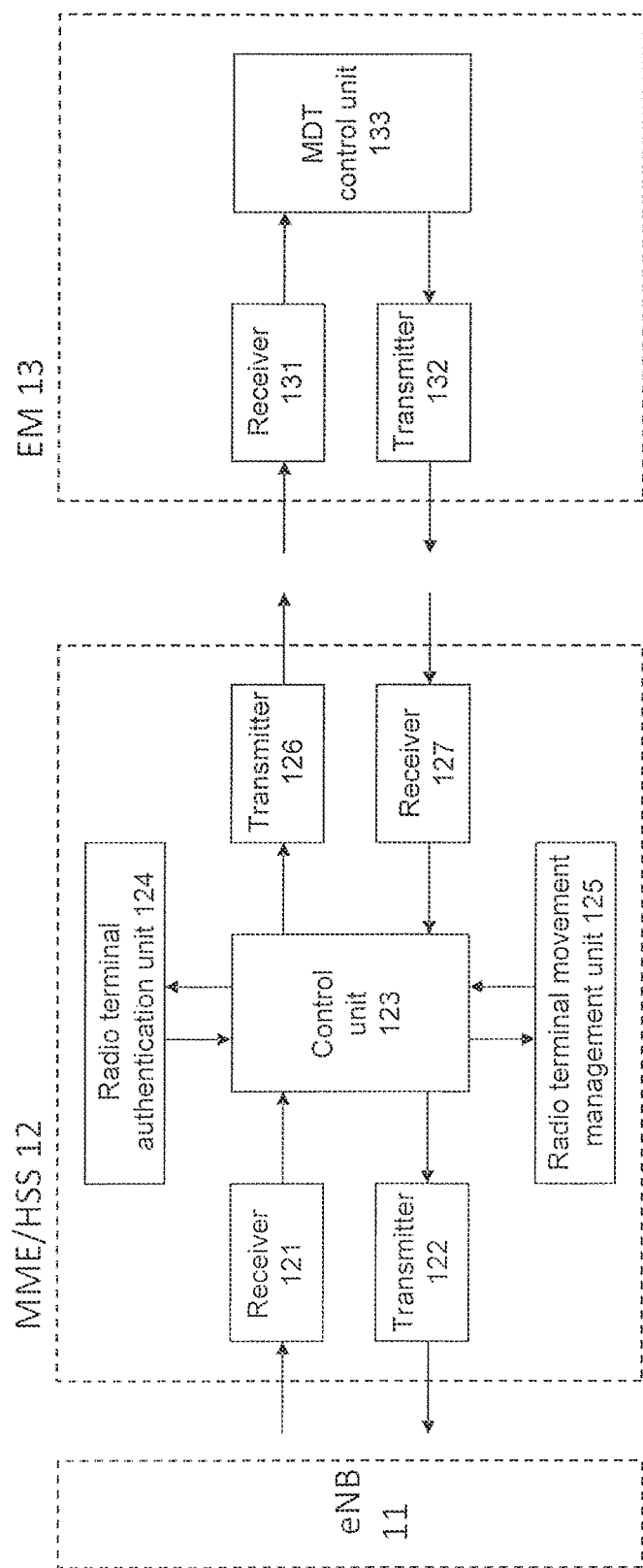
FIG. 7 is a block diagram of a radio network (MME/HSS/EM) in accordance with the first radio communication system.
Figure 8:
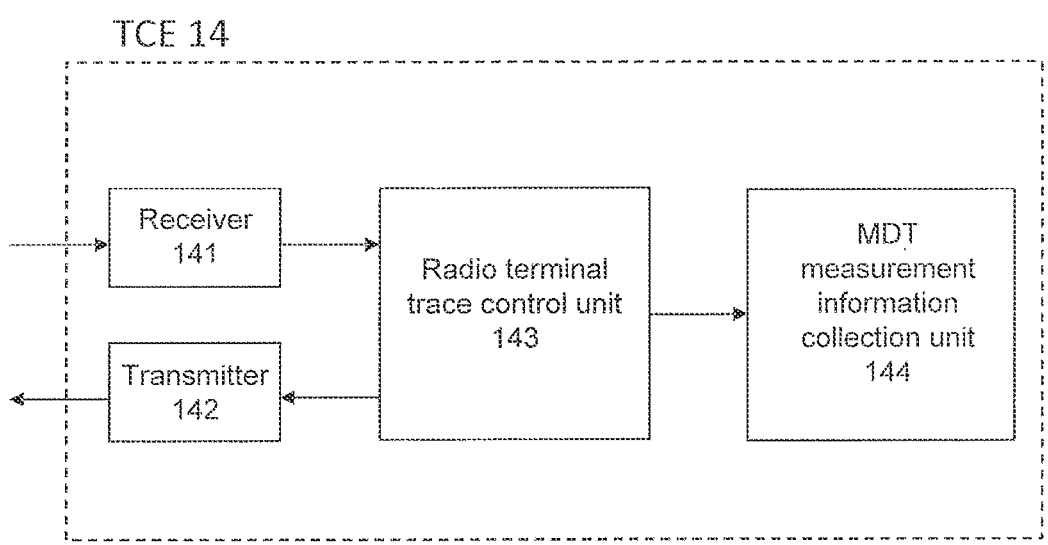
FIG. 8 is a block diagram of an information collection server (TCE) in accordance with the first radio communication system.

FIG. 6 to FIG. 8 are function diagrams of the radio terminal (UE) and each radio network node in the first radio communication system.

FIG. 6 is a block diagram of the radio terminal (UE) 10 and the radio base station (eNB) 11. The radio terminal (UE) 10 includes a radio signal receiver 101 that receives radio signals from the radio base station (eNB) 11, a demodulator 102 that demodulates the received signals, a control unit 103 that controls operations of the UE such as execution of measurement based on demodulated information, a measurement unit 104 that executes measurement based on the instructions from the control unit 103 or the received radio signals, a signal generation unit 105 that generates transmission signals from the measurement results or information data, and a radio signal transmitter 106 that transmits transmission signals by radio, and the like.

The radio base station (eNB) 11 includes a radio signal receiver 111 that receives radio signals from the radio terminal (UE) 10, a demodulator 112 that demodulates the received radio signals, a measurement information storing unit 113 that stores demodulated measurement information, a transmitter 114 that transmits uplink data or measurement information received from the UE 10 to an upper station (e.g. MME, EM, or TCE), a receiver 115 that receives signals from an upper station, a control unit 116 that controls generation of transmission signals to the UE 10 or transmission of measurement information to an upper station, a signal generation unit 117 that generates transmission signals to the UE 10, a radio signal transmitter 118 that transmits radio signals to the UE 10, and the like.

FIG. 7 is a block diagram of the mobility management apparatus (MME)/the home subscriber management server (HSS) 12 of the radio terminal, and a block diagram of the EM 13. The MME/HSS 12 includes a receiver 121 that receives signals from the radio base station (eNB), a transmitter 122 that transmits signals to the eNB, a control unit 123 that controls various functions, a radio terminal authentication unit 124 that authenticates the radio terminal (UE) 10, a radio terminal mobility management unit 125 that performs mobility and management of the UE 10, a transmitter 126 that transmits signals to the network operation management apparatus (EM) 13 or the network (operator network or the Internet), a receiver 127 that receives signals from the network operation management apparatus (EM) 13 or the network (operator network or the Internet), and the like.

The network operation management apparatus (EM) 13 includes a receiver 131 that receives signals from the radio base station (eNB) 11 or the MME/HSS 12, a transmitter 132 that transmits signals to the radio base station (eNB) 11 or the MME/HSS 12, a MDT control unit 133 that performs control related to MDT, and the like. Note that the MME/HSS 12 is described in the same block diagram in FIG. 7, but each of the MME and the HSS may be described in a block diagram as an independent node, the present invention can be performed in either case.

FIG. 8 is a block diagram of a trace information collection apparatus (TCE) 14. The TCE 14 includes a receiver 141 that receives signals from the radio base station (eNB) 11 or the upper network node (MME/HSS 12 or EM 13), a transmitter 142 that transmits signals to the eNB 11 or the upper network node, a radio terminal trace control unit 143 that performs tracing (tracing management) of the radio terminal (UE) 10, a MDT measurement information collection unit 144 that collects MDT measurement results, and the like.

Third Embodiment

Figure 9:
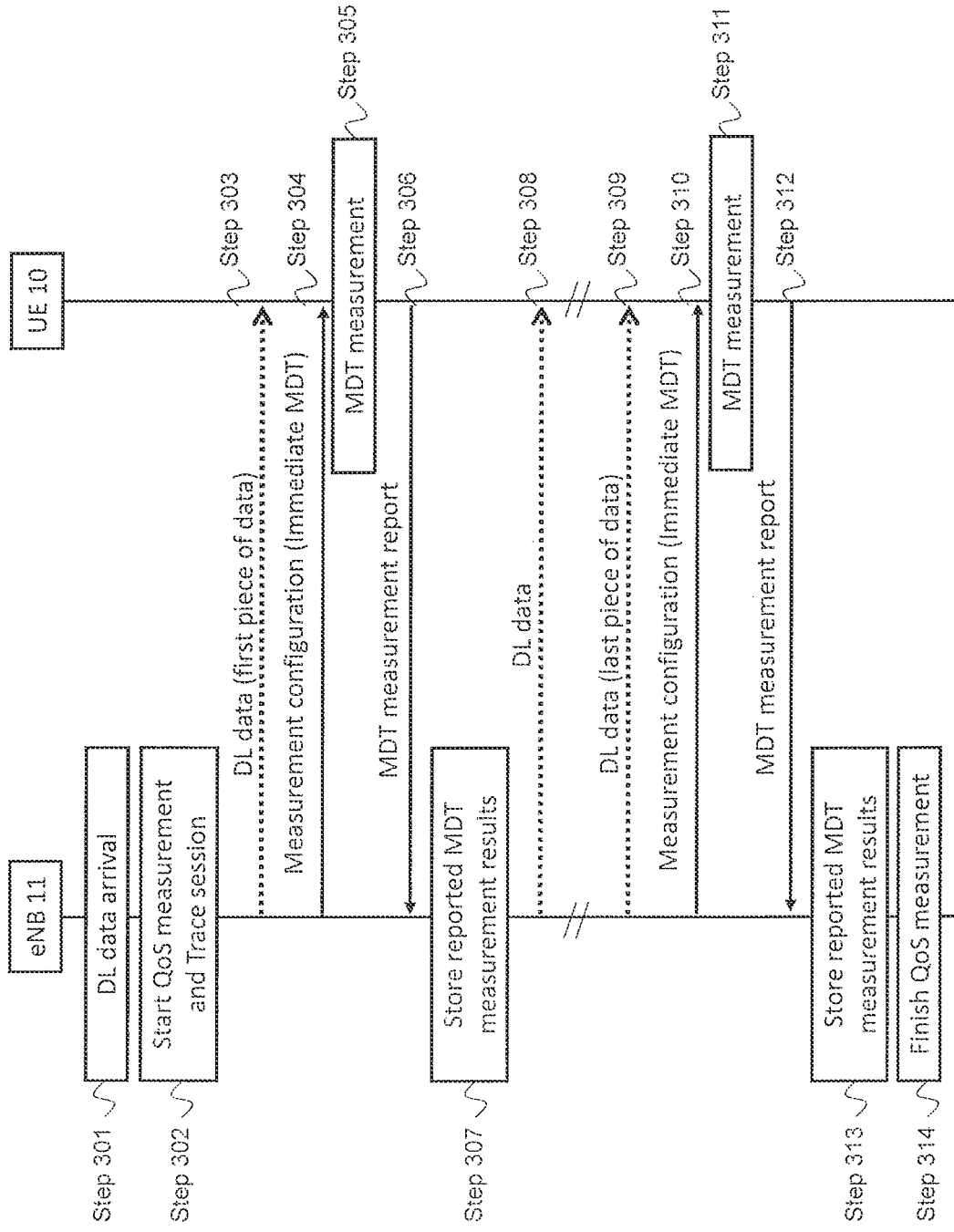
FIG. 9 is a sequence diagram illustrating operations of the radio base station (eNB) and the radio terminal (UE) in accordance with a third embodiment of the present invention.

FIG. 9 is a sequence diagram illustrating operations of the radio base station (eNB) 11 and the radio terminal (UE) 10 in accordance with the third embodiment of the present invention. In the present embodiment, as quality measurement related to a service quality (e.g. QoS), it is assumed to execute measurement of throughput per user of downlink data (hereinafter, "throughput per user" will be referred to simply as "throughput", unless especially described). Note that a definition of throughput may be conceivable in various ways, but an application scope of the present invention is not limited by the definition, and can be applied to anything. At the start and the end of throughput measurement, the eNB 11 also instructs the UE 10 to obtain information related to a location and report the obtained information related to the location. Further, in FIG. 9, it is assumed that the eNB 11 receives instructions to perform throughput measurement in MDT from an upper network (e.g. EM 13 or EPC 14).

In FIG. 9, the eNB 11 firstly acknowledges a reception of downlink data for the UE 10 under control of the eNB 11 (Step 301: DL data arrival). Here, it is assumed that the UE10 is already in an active state (that is, RRC_Connected state). Next, the eNB 11 starts throughput measurement of the downlink data for the UE 10, and starts a trace session for information collection by MDT (Step 302: Start QoS measurement and Trace Session). The eNB 11 starts to transmit the downlink data (that is, packets) to the UE 10 (Step 303: DL data (first piece of data)), and instructs the UE 10 to perform execution of MDT measurement reporting (that is, measurement of received quality and obtainment of information related to location, and report thereof) (Step 304: Measurement configuration (Immediate MDT)). In this case, for example, the eNB 11 instruct the UE 10 to perform execution of MDT measurement reporting one time. In accordance with the instructions, the UE 10 performs MDT measurement (Step 305: MDT Measurement), and reports the results of the MDT measurement to the eNB 11 (Step 306: MT measurement report). The eNB 11 stores the results of the MDT measurement reported from the UE 10 (Step 307: Store reported MDT measurement results). The eNB arbitrarily transmits the remaining downlink data to the UE (Step 308: DL data). Then, when completing transmission of last downlink data (Step 309: DL data (last piece of data), the eNB 11 instructs the UE 10 to execute the MDT measurement again (Step 310: measurement configuration (Immediate MDT)). In accordance with the instructions, the UE 10 executes the MDT measurement (Step 311: MDT Measurement), and reports the results of the MDT measurement to the eNB 11 (Step 312: MT measurement report). The eNB 11 stores the results of the MDT measurement reported from the UE 10 (Step 313: Store reported MDT measurement results). The eNB finishes the throughput measurement and stores the results. (Step 314: Finish QoS measurement).

Hereafter, the eNB 11 adds a common identifier (e.g. Trace Reference ID) for associating the throughput measurement results with the information related to the location of the UE 10, or generates one information element including the throughput measurement results and the information related to the location of the UE 10, or performs both addition and generation, and transmits the throughput measurement results and the information related to the location of the UE 10 to the TCE (not shown in FIGs). Further, it is conceivable that the eNB also transmits to the TCE, QoS information (e.g. QoS Class Indicator: QCI) which was the target for quality measurement, received quality of a serving cell or neighboring cells that is/are measured by the UE 14 which was the target for quality measurement, and information related to a time at which the received quality was (has been) measured.

By the above-operations, when the radio base station (eNB) 11 executes quality measurement (e.g. throughput measurement) related to a service quality (e.g. QoS), it is possible to effectively collect information related to a location of the radio terminal (UE) 10 to be a target for the quality measurement, and to clearly associate the results of the quality measurement with the information related to the location of the radio terminal (UE) 10. Further, this enables the information collection server (TCE) 14, which has collected the results of the quality measurement and the information related to the location of the radio terminal (UE) 10 from the radio base station (eNB) 11, to understand which results of the quality measurement are the results as to where (that is, which location) the radio terminal (UE) 10 stayed, thereby being able to use such information effectively.

Further, it is expected to make quality measurement more meaningful by reporting "the radio network information", or "the radio terminal information" described above in addition to measurement values of throughput and the information related to the location collected from the UE 10, and reporting them to the TCE 14.

Note that, in the third embodiment, the information related to a location at both the start and the end of throughput measurement is obtained and reported, however, the information at either the start or the end may be reported. Further, although the information at both the start and the end is obtained, but the information at either the start or the end may be reported.

Further, in the third embodiment, the example in which Immediate MDT is used is described, but a UE in a RRC_Connected state may perform Logged MDT. For example, in the third embodiment, the UE may obtain and report the information related to a location at both the start and the end of throughput measurement, and report the information to the eNB 11 collectively later on.

Further, in the third embodiment, when the UE 10 to be a target for throughput measurement performs handover during a period of throughput measurement, the UE 10 may measure throughput up to an execution point of handover. At this time, as to the information related to a location of the UE 10, the information which the UE 10 obtains at the start of throughput measurement or at the time of handover is collected. Note that, it is conceivable that "at the time of handover" refers to, for example, at a time point when the eNB 11 satisfying the requirements of measurement report for performing handover transmits handover instructions (RRC Connection Reconfiguration, or Handover command), or at a time point when the UE 10 receives the handover instructions. On the other hand, the results of throughput may be transmitted to the TCE 14 as invalid values, instead of the results of throughput measurement up to an execution of handover. Similarly, when a call disconnection (Radio Link Failure: RLF) occurs during a period of throughput measurement, the results of throughput may be transmitted to the TCE as invalid values.

Here, as a method for the use of the collected information related to a location, it is conceivable that detailed location information at the start and the end of quality measurement is processed by linear interpolation, a point where a radio terminal stays during a period of the quality measurement (in the third embodiment, during a period of throughput measurement) is estimated, and the results of the quality measurement (that is, throughput values) are mapped to the point where the radio terminal stays. On the other hand, as to the information related to a location, it is conceivable that when collecting RF fingerprint, received power (or, received quality) of each cell during a period of quality measurement is averaged every predetermined period, and the quality measurement results (that is, throughput values) are mapped to a coverage map based on the averaged received power (or, received quality). However, it is not limited thereto, but various usage embodiments are possible.

<Modification 1 of Third Embodiment>

In the third embodiment, it is assumed to perform throughput measurement as quality measurement related to a service quality (e.g. QoS), and the radio terminal (UE) 10 obtains and reports information related to a location at the start and the end of the throughput measurement, but furthermore in the modification 1 of the third embodiment, when the radio terminal (UE) 10 obtains detailed location information by GPS or LCS, the UE reports such information. The other operations are basically the same as those of the third embodiment, so that explanation thereof will be omitted.

In the modification 1 of the third embodiment, when the radio base station (eNB) 11 firstly receives downlink data to be transmitted to the radio terminal (UE) 10 under control of the radio base station (eNB) 11, the radio base station (eNB) 11 starts throughput measurement for the UE 10 and instructs the UE 10 to obtain and report information related to a location. Further, the eNB 11 instructs the UE 10 to report detailed location information when the UE 10 obtains the detailed location information by GPS or LCS. Note that the instructions may be performed as instructions of execution of MDT measurement reporting of Immediate MDT, or performed using another new message. When the UE 10 obtains the detailed location information during throughput measurement in the eNB 11, the UE 10 reports it to the eNB 11. Note that the UE 10 does not necessarily recognize that the throughput measurement is performed, the eNB 11 may instruct to stop (or, cancel) corresponding instructions after finishing the throughput measurement. Also, when using Logged MDT by the UE in a RRC_Connected state instead of Immediate MDT, the UE 10 stores the obtained detailed location information, and reports it to the eNB 11 at a predetermined timing. Thereafter, the eNB 11 instructs the UE 10 to obtain the information related to the location when finishing the throughput measurement, and the UE10 reports the obtained information related to the location to the eNB 11 in accordance with the instructions.

Like this, not only the information related to the location of the UE 10 to be a target for throughput measurement at the start and the end of the throughput measurement, the UE 10 collects detailed location information obtained by GPS or LCS during the throughput measurement, thereby being able to perform, in greater detail, mapping of the throughput measurement and the place where the targeted UE 10 stayed.

<Modification 2 of Third Embodiment>

In the third embodiment, it is assumed to perform throughput measurement as quality measurement related to a service quality (e.g. QoS), information related to a location of the radio terminal (UE) 10 at the start and the end of the throughput measurement is collected. Further, in the modification 1 of the third embodiment, when obtaining detailed location information by GPS or LCS, such information is also collected. In the modification 2 of the third embodiment, when the radio terminal (UE) 10 obtains the detailed location information by GPS or LCS while the radio base station (eNB) 11 performs the throughput measurement, the radio base station (eNB) 11 instructs the radio terminal (UE) 10 to report such information, and when the UE does not obtain the detailed location information during the throughput measurement, the radio base station (eNB) 11 instructs the UE to obtain and report the information related to a location at the end of the throughput measurement. The other operations are basically the same as those of the third embodiment, so that explanation thereof will be omitted.

In the modification 2 of the third embodiment, when the radio base station (eNB) 11 firstly receives downlink data to be transmitted to the radio terminal (UE) 10 under control of the radio base station (eNB) 11, the radio base station (eNB) 11 starts throughput measurement for the UE 10, and instructs the UE to report detailed location information when the UE obtains the detailed location information by GPS or LCS. Note that the instructions may be performed as instructions of execution of MDT measurement reporting of Immediate MDT, or performed using another new message. When the UE 10 obtains the detailed location information during throughput measurement in the eNB 11, the UE 10 reports it to the eNB 11. Note that the UE 10 does not necessarily acknowledge recognize that the throughput measurement is performed, the eNB 11 may be configured to stop (or, cancel) corresponding instructions after finishing the throughput measurement. Also, when using Logged MDT by the UE in a RRC_Connected state instead of Immediate MDT, the UE 10 stores the obtained detailed location information, and reports it to the eNB 11 at a predetermined timing. Then, after finishing the throughput measurement, the eNB 11 instructs the UE 10 to obtain the information related to the location only when not receiving a report of the detailed location information from the UE 10 during the throughput measurement, and the UE10 reports the obtained information related to the location to the eNB 11 in accordance with the instructions.

Like this, the UE 10 collects detailed location information obtained by GPS or LCS during throughput measurement, thereby being able to perform, in greater detail, mapping of the throughput measurement and the place where the targeted UE 10 stayed. Further, even when the UE 10 does not obtain the detailed location information and does not report it to the eNB 11, the UE 10 collects information related to a location at the end of the throughput measurement, thereby being able to understand throughput values as to where the UE lastly stayed.

Here, in another embodiment, when the UE 10 does not obtain detailed location information in a predetermined period, the eNB11 may preliminarily instruct the UE 10 to obtain and report information related to a location after the end of a predetermined period. Further, in another embodiment, the eNB 11 may preliminarily instruct the radio terminal (UE) 10 to report information related to a location at the start of throughput measurement, instead of that the eNB 11 may instruct the UE to obtain and report the information related to the location at the end of the throughput measurement.

Note that, in the third embodiment and the modifications thereof, as the quality measurement related to a service quality (e.g. QoS), (downlink) throughput is used as an example, but it is obvious to be also applied to other quality measurements in a similar manner.

Fourth Embodiment

Figure 10:
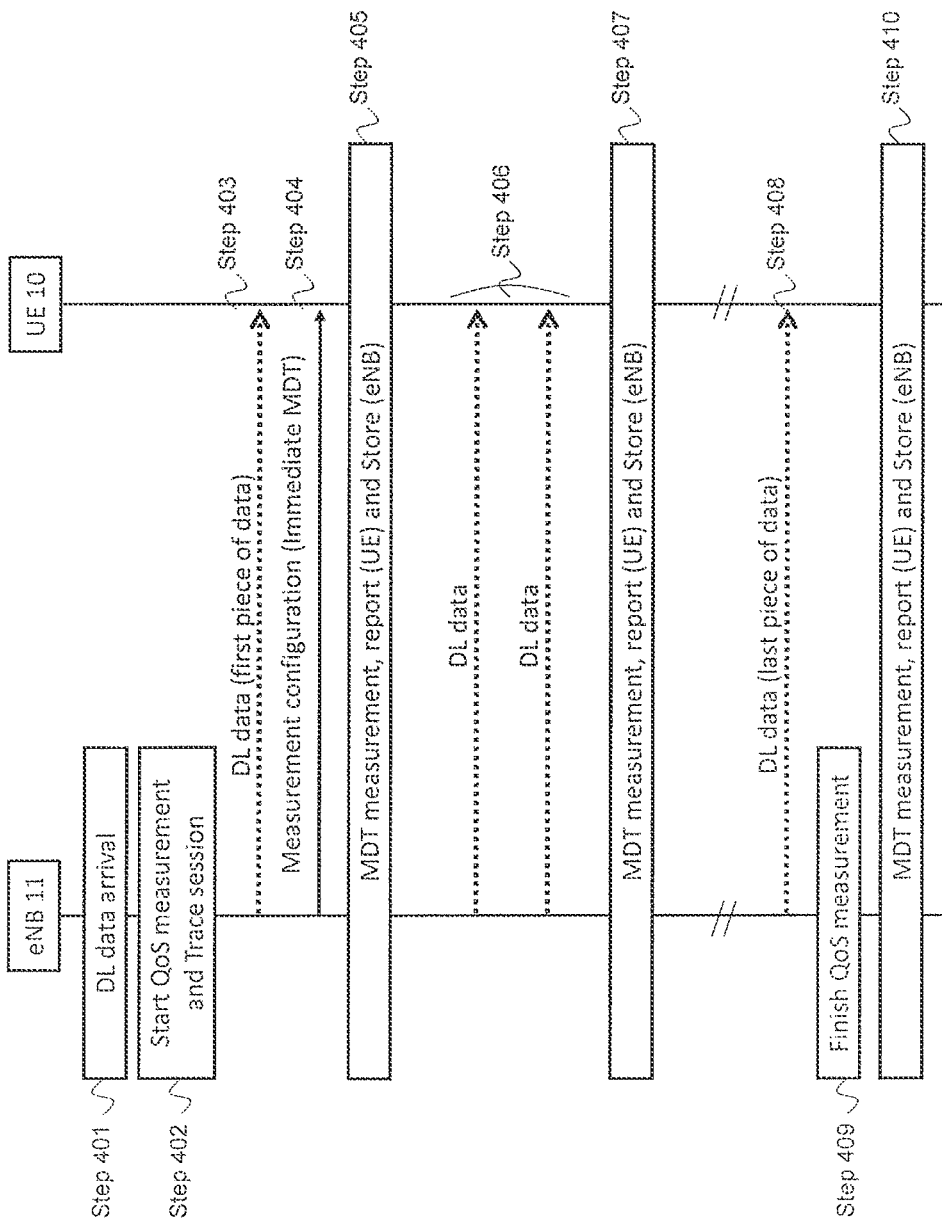
FIG. 10 is a sequence diagram illustrating operations of the radio base station (eNB) and the radio terminal (UE) in accordance with a fourth embodiment of the present invention.

FIG. 10 is a sequence diagram illustrating operations of the radio base station (eNB) 11 and the radio terminal (UE) 10 in accordance with a fourth embodiment of the present invention. In the present embodiment, as quality measurement related to a service quality (e.g. QoS), it is assumed to perform the measurement of a packet loss rate and of a packet discard rate of downlink data. Note that a definition of a packet loss rate and of a packet discard rate may be conceivable in various ways, but an application scope of the present invention is not limited by the definition, and can be applied to anything. The eNB 11 also instructs the UE 10 to periodically obtain and report information related to a location during the quality measurement, that is, during the measurement of a packet loss rate and of a packet discard rate. Then, the eNB 11 reports to the information collection server (TCE) 14 of MDT, the measurement results of a packet loss rate and of a packet discard rate and the information related to the location reported from the UE. Note that "during the quality measurement" is not only from the start to the end of quality measurement, but may include right before the start and right after the end of quality measurement. Further, in FIG. 10, it is assumed that the eNB 11 receives instructions to execute measurement of a packet loss rate and of a packet discard rate by MDT from an upper network (e.g. EM or EPC).

In FIG. 10, the eNB 11 firstly acknowledges a reception of downlink data for the UE 10 under control of the eNB 11 (Step 401: DL data arrival). Here, it is assumed that the UE10 is already in an active state (that is, RRC_Connected state). Next, the eNB 11 starts measurement of a packet loss rate and a packet discard rate of the downlink data for the UE 10, and starts a trace session for information collection by MDT (Step 402: Start QoS measurement and Trace Session). The eNB starts to transmit the downlink data (that is, packets) to the UE (Step 403: DL data (first piece of data)), and instructs the UE to perform execution of MDT measurement reporting (that is, measurement of received quality and obtainment of information related to location, and report thereof) (Step 404: Measurement configuration (Immediate MDT)).

The UE 10 performs MDT measurement at a predetermined period specified by Step 404, and reports the results of the received quality and the information related to the location to the eNB 11, and the eNB 11 stores the reported results of MDT measurement (Step 405: MDT measurement, report (UE) and Store (eNB11)). The eNB 11 continuously transmits the downlink data (Step 406: DL data), and the UE 10 performs MDT measurement reporting at a predetermined period. (Step 407: MDT measurement, report (UE) and Store (eNB)). When completing transmission of the last downlink data (Step 408: DL data (last piece of data), the eNB 11 finishes the measurement of a packet loss rate and a packet discard rate and stores the results (Step 409: Finish QoS measurement). Then, the eNB 11 stores the information on MDT measurement reporting transmitted from the UE right after the end of the quality measurement (Step 410: MDT measurement, report (UE) and Store (eNB)).

Hereafter, the eNB 11 adds a common identifier (e.g. Trace Reference ID) for associating the measurement results of a packet loss rate and a packet discard rate with the information related to the location of the UE 10, or generates one information element including the measurement results of a packet loss rate and a packet discard rate and the information related to the location of the UE 10, or performs both addition and generation, and transmits the measurement results of a packet loss rate and a packet discard rate and the information related to the location of the UE 10 to the TCE 14 (not shown in FIGs). Note that the eNB 11 may transmit to the TCE 14, MDT measurement reporting collected from the UE 10 right before the end of the quality measurement, not right after the end thereof.

By the above-operations, when the radio base station (eNB) 11 executes quality measurement (e.g. measurement of a packet loss rate and a packets discard rate) related to a service quality (e.g. QoS), it is possible to effectively collect information related to a location of the radio terminal (UE) 10 to be a target for the quality measurement, and to clearly associate the results of the quality measurement with the information related to the location of the radio terminal (UE) 10. Further, this enables the information collection server (TCE) 14, which has collected the results of the quality measurement and the information related to the location of the radio terminal (UE) 10 from the radio base station (eNB) 11, to understand which results of the quality measurement are the results as to where (that is, which location) the radio terminal (UE) 10 stayed, thereby being able to use such information effectively.

Here, in the fourth embodiment, the example in which Immediate MDT is used is described, but the UE in a RRC_Connected state may perform Logged MDT. For example, in the fourth embodiment, the eNB may instruct the UE to perform Logged MDT at the start of measurement of a packet loss rate and a packet discard rate (or before the start), and to report at the end thereof (or a predetermined timing before the end).

Further, in the fourth embodiment, when the UE 10 to be a target for throughput measurement performs handover during a period of measurement, the UE 10 may measure a packet loss rate and a packet discard rate up to an execution point of handover. At this time, as to the information related to a location of the UE 10, the information which is already reported by the time of handover is reported to the TCE 14. Note that, it is conceivable that "at the time of handover" refers to, for example, at a time point when the eNB 11 satisfying the requirements of measurement report for performing handover transmits handover instructions (RRC Connection Reconfiguration, or Handover command), or at a time point when the UE 10 receives the handover instructions. On the other hand, the results of a packet loss rate and a packet discard rate may be transmitted to the TCE 14 as invalid values, instead of the measurement results up to an execution point of handover. Similarly, when a call disconnection (Radio Link Failure: RLF) occurs during a measurement period of a packet loss rate and a packet discard rate, the measurement results may be transmitted to the TCE 14 as invalid values.

Further, as described in the third embodiment, even in the fourth embodiment, it is expected to make quality measurement more meaningful by reporting "the radio network information" or "the radio terminal information" in addition to measurement values of a packet loss rate and a packet discard rate and the information related to the location collected from the UE, and reporting them to the TCE 14.

Here, as a method for the use of the collected information related to a location, it is conceivable that detailed location information during a period of quality measurement is processed by linear interpolation, a point where a radio terminal stays during a period of the quality measurement (in the fourth embodiment, during a measurement period of a packet loss rate and a packet discard rate) is estimated, and the results of the quality measurement (that is, a packet loss rate and a packet discard rate) are mapped to the point where the radio terminal stays. However, it is not limited thereto, but various usage embodiments are possible.

<Modification 1 of Fourth Embodiment>

In the fourth embodiment, it is assumed to execute measurement of a packet loss rate and a packet discard rate as quality measurement related to a service quality (e.g. QoS), and the radio terminal (UE) 10 periodically obtains and reports information related to a location during a measurement period, and the radio base station (eNB) 11 transmits such information to the information collection server (TCE) 14. But, in the modification 1 of the fourth embodiment, as to the information related to a location of the UE 10 which is transmitted from the eNB 11 to the TCE 14, the eNB 11 selects necessary information from among the information collected periodically.

In the modification 1 of the fourth embodiment, the operations which the radio base station (eNB) 11 performs from the start to the end of measurement of a packet loss rate and a packet discard rate, and the operations which the radio terminal (UE) 10 performs therefrom thereto are basically the same as those of the fourth embodiment. Thereafter, the eNB 11 selects the information included in MDT measurement reporting with a predetermined period (e.g. a predetermined period longer than that period), which is different from a period instructed to the UE 10 by Immediate MDT, from among MDT measurement reporting collected during a measurement period of a packet loss rate and a packet discard rate, and transmits the selected information together with the measurement results of a packet loss rate and a packet discard rate to the TCE 14.

This is expected to bring effects, such as reduction of the amount of information to be transmitted to the TCE 14, or reduction of processing for selecting necessary information in the TCE 14, when it is difficult to estimate in advance how long a period of quality measurement actually is, or when it is unknown (or unclear) how fast the radio terminal (UE) 10 moves. For example, it is desired to precisely collect information related to a location to some extent, but when it is unknown how fast the UE 10 moves, it is necessary to instruct the UE 10 to obtain and report the information related to a location at a relatively short period. However, as a result of actual information collection as to a location, when the UE 10 does not move enough, as to a period of the information related to the location that is necessary (or, helpful) in the TCE 14, it is assumed to be a relatively longer period than a collected period. In such a case, it is conceivable that the operations of the embodiment are effective.

Note that the method for selecting information by the eNB 11 is not limited to other than a periodical selection, it may be performed based on that how far the UE moves, or how much data (that is, packet) the UE 10 transmits. For example, when making a selection based on the movement of the UE 10, it is conceivable as a method to select the information other than the one related to a location that is initially collected, whenever the UE 10 moves for more than a predetermined distance, or whenever received quality of a serving cell is changed more than a predetermined value. Also, when making a selection based on the amount of data (that is, packet) transmission, it is conceivable as a method to select the information other than the one related to a location that is initially collected, whenever a predetermined amount of data is transmitted to the UE 10.

<Modification 2 of Fourth Embodiment>

In modification 1 of the fourth embodiment, it is assumed to execute measurement of a packet loss rate and a packet discard rate as quality measurement related to a service quality (e.g. QoS), and the radio base station (eNB) 11 makes a selection from among the information related to a location periodically collected from the radio terminal (UE) 10 during a period of measurement, and transmits the selected information to the information collection server (TCE) 14. But, in the modification 2 of the fourth embodiment, the UE 10 makes such a selection. For example, it is conceivable as a method to report the information related to a location that the eNB 11 notifies the UE 10 of information to be a basis for selection, and only when satisfying the basis for the selection.

Note that, in the fourth embodiment and the modifications thereof, as the quality measurement related to a service quality (e.g. QoS), a packet loss rate and a packet discard rate (of downlink) are used as an example, but it is obvious to be also applied to other quality measurements in a similar manner.

Fifth Embodiment

Figure 11:
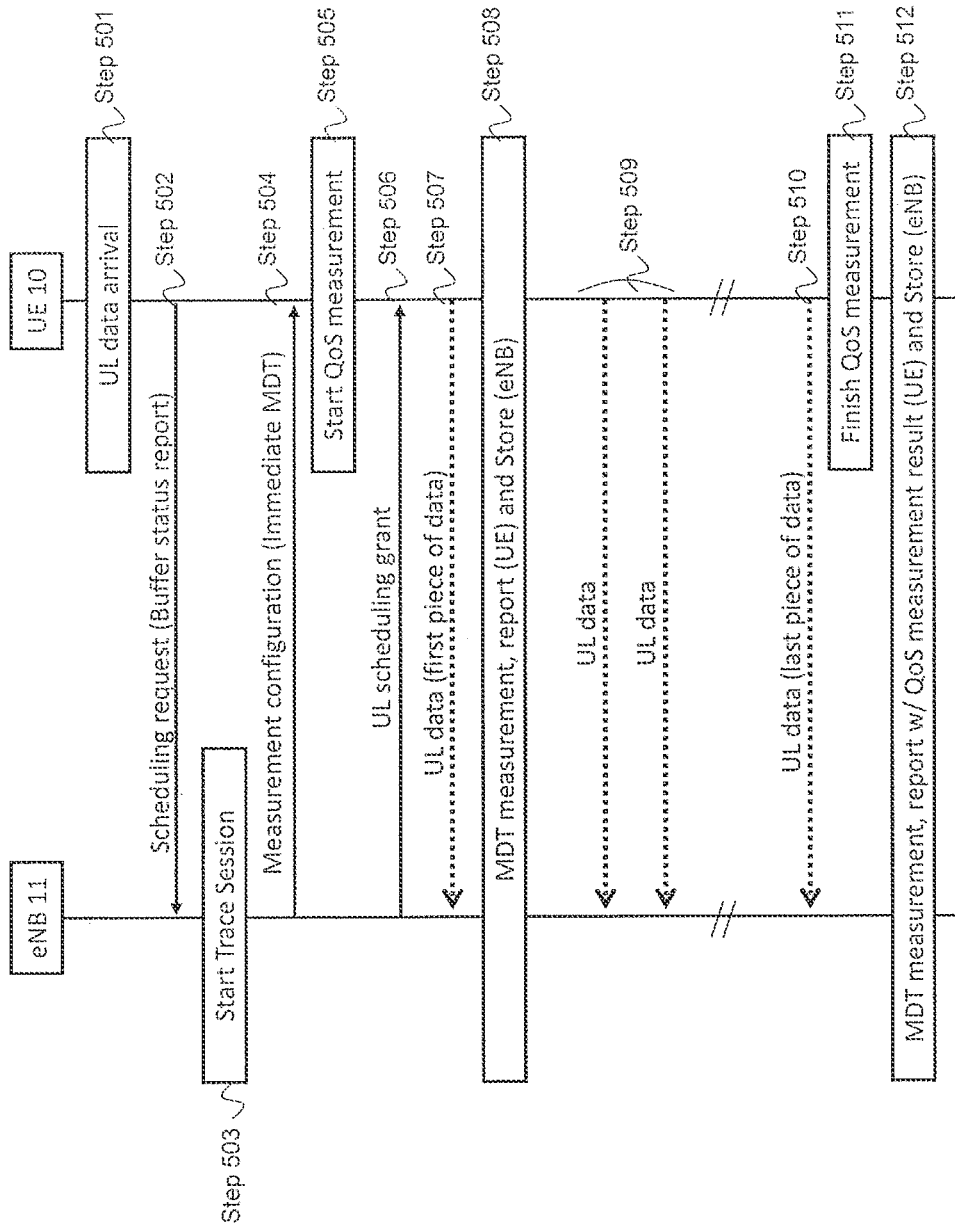
FIG. 11 is a sequence diagram illustrating operations of the radio base station (eNB) and the radio terminal (UE) in accordance with a fifth embodiment of the present invention.

FIG. 11 is a sequence diagram illustrating operations of the radio base station (eNB) 11 and the radio terminal (UE) 10 in accordance with a fifth embodiment of the present invention. In the present embodiment, as quality measurement related to a service quality (e.g. QoS), it is assumed to perform throughput measurement of uplink data. Note that a definition of throughput may be conceivable in various ways, but an application scope of the present invention is not limited by the definition, and can be applied to anything. The eNB 11 also instructs the UE 10 to obtain information related to a location and report the obtained information related to the location at the start and the end of throughput measurement. Here, it is conceivable that "at the start of measurement" is at the start of a session (at setup of Bearer) to be a target for the quality measurement, or at the transmission and reception of first data of the session (that is, transmission or reception by the eNB 11, or transmission or reception by the UE 10), or when data belonging to a predetermined QoS (or, QoS group, QCI) is generated, or when data belonging to a predetermined QoS (or, QoS group, QCI) is transmitted, or when data is generated (that is, data is available) in a predetermined logical channel group (Logical Channel Group: LCG), or when predetermined LCG data is transmitted, or the like. It is also conceivable that "at the end of measurement" is at the end of a session or at the decision of end of a session to be a target for the quality measurement, or when last data in a session is transmitted (or received), at the time of completion of last data transmission (or, completion of last data reception), or when data belonging to a predetermined QoS (or, Qos group, QCI) is gone, or when predetermined LCG data is gone (that is, empty), or the like. Further, in FIG. 11, it is assumed that the eNB 11 receives instructions to perform throughput measurement (instruct the UE 10 to execute measurement in the fifth embodiment) by MDT from an upper network (e.g. EM 13 or EPC 14).

In FIG. 9, the UE 10 recognizes a generation of uplink data (Step: UL data arrival) and transmits a scheduling request for an uplink radio resource to the eNB 11 (Step 502: Scheduling Request (Buffer status report)). Here, it is assumed that the UE 10 is already in an active state (that is, RRC connected_state) and a radio resource for transmitting a scheduling request is already allocated. The UE 10 also performs a status report of transmission buffers (Buffer status report: BSR) together with the scheduling request, but the UE 10 does not necessarily perform the status report and the scheduling request in the same message or at the same timing, the UE 10 may firstly transmit only the scheduling request. Next, the eNB 11 starts a trace session for collecting information by MDT (Step 503: Start Trace Session), so as to instruct the UE 10 to measure throughput measurement of uplink data of the UE 10, and instructs the UE 10 to execute MDT measurement reporting (that is, measurement of received quality, obtainment of information related to a location and report of such measurement and information) (Step 504: Measurement configuration (Immediate MDT)). When receiving the instructions, the UE 10 starts throughput measurement of uplink data (Step 505: Start QoS measurement). The eNB 11 notifies the UE 10 of an uplink radio resource allocation (Step 506: UL scheduling grant), and followed by the notification, the UE 10 starts transmission of the uplink data (Step 507: UL data (first piece of data)). The UE 10 also executes MDT measurement, and reports the results of received quality and the obtainment results of the information related to the location to the eNB 11 right after transmitting the first uplink data, and then the UE 10 stores the reported information (Step 508: MDT measurement, report (UE) and Store (eNB)). Note that MDT measurement may be executed right before transmission of the first uplink data or at the transmission of the first uplink data, not right after transmission of the first uplink data. Thereafter, the UE 10 continues transmission of the uplink data. (Step 509: UL data).

Note that the steps of an uplink radio resource allocation of after the first transmission are omitted in FIG. 11. When completing transmission of the last uplink data (Step 510: UL data (last piece of data)), the UE 10 performs throughput measurement of the uplink data (Step 511: Finish QoS measurement). Then, the UE 10 executes MDT measurement, and reports the results of the received quality, the obtainment results of the information related to the location to the eNB 11 and the throughput results to the eNB 11, and the eNB 11 stores the reported information (Step 512: MDT measurement, report w/QoS measurement result (UE) and Store (eNB)). Note that the UE 10 may execute right before transmission of last uplink data or at the transmission of last uplink data, not right after completion of the last uplink data transmission.

Hereafter, the eNB 11 adds a common identifier (e.g. Trace Reference ID) for associating the throughput measurement results with the information related to the location of the UE 10, or generates one information element including the throughput measurement results and the information related to the location of the UE 10 (or, performs both addition and generation), and transmits the throughput measurement results and the information related to the location of the UE 10 to the TCE 14 (not shown in FIGs). Further, it is conceivable that the eNB also transmits to the TCE 14, QoS information (e.g. QoS Class Indicator: QCI) which was the to be a target for quality measurement, received quality of a serving cell or neighboring cells that is/are measured by the UE which was the target for quality measurement, and the information related to a time at which the received quality was (has been) measured.

By the above-operations, when the radio base station (eNB) 11 instructs the UE 10 to execute quality measurement (e.g. throughput measurement) related to a service quality (e.g. QoS), it is possible to effectively collect information related to a location of the radio terminal (UE) 10 which executes the quality measurement, and to clearly associate the results of the quality measurement with the information related to the location of the radio terminal (UE) 10. Further, this enables the information collection server (TCE) 14, which has collected the results of the quality measurement and the information related to the location of the radio terminal (UE) 10 from the radio base station (eNB) 11, to understand which results of the quality measurement are the results as to where (that is, which location) the radio terminal (UE) 10 stayed, thereby being able to use such information effectively.

Further, as in the third or the fourth embodiment, it is expected to make quality measurement more meaningful by reporting "the radio network information" or "the radio terminal information" described above in addition to measurement values of throughput and the information related to the location collected from the UE 10, and reporting them to the TCE 14.

Note that, in the fifth embodiment, the information related to a location at both time points (that is, at the start and the end of throughput measurement) is obtained and reported, however, the information at either of both time points may be reported. Further, although the information at both time points is obtained, but the information at either of both time points may be reported.

Further, in the fifth embodiment, the example in which Immediate MDT is used is described, but the UE in a RRC_Connected state may perform Logged MDT. For example, in the fifth embodiment, the UE 10 may obtain and report the information related to a location at both time points (that is, at the start and the end of throughput measurement), and report the information to the eNB 11 collectively later on.

Further, in the fifth embodiment, when the UE 10 to be a target for throughput measurement performs handover during a period of throughput measurement, the UE 10 may measure throughput up to an execution point of handover. At this time, as to the information related to a location of the UE 10, the information which the UE 10 obtains at the start of throughput measurement or the time of handover is collected. Note that, it is conceivable that "at the time of handover" refers to, for example, at a time point when the eNB 11 satisfying the requirements of measurement report for performing handover transmits handover instructions (RRC Connection Reconfiguration, or Handover command), or at a time point when the UE 10 receives the handover instructions. On the other hand, the results of throughput may be transmitted to the TCE 14 as invalid values, instead of the results of throughput measurement up to an execution point of handover. Similarly, when a call disconnection (Radio Link Failure: RLF) occurs during a period of throughput measurement, the results of throughput may be transmitted to the TCE as invalid values.

Here, as a method for the use of the collected information related to a location, it is conceivable that detailed location information at the start and the end of quality measurement is processed by linear interpolation, a point where a radio terminal stays during a period of quality measurement (in the fifth embodiment, during a period of throughput measurement) is estimated, and the results of the quality measurement (that is, throughput values) are mapped to the point where the radio terminal stays. However, it is not limited thereto, but various usage embodiments are possible.

Sixth Embodiment

Figure 12:
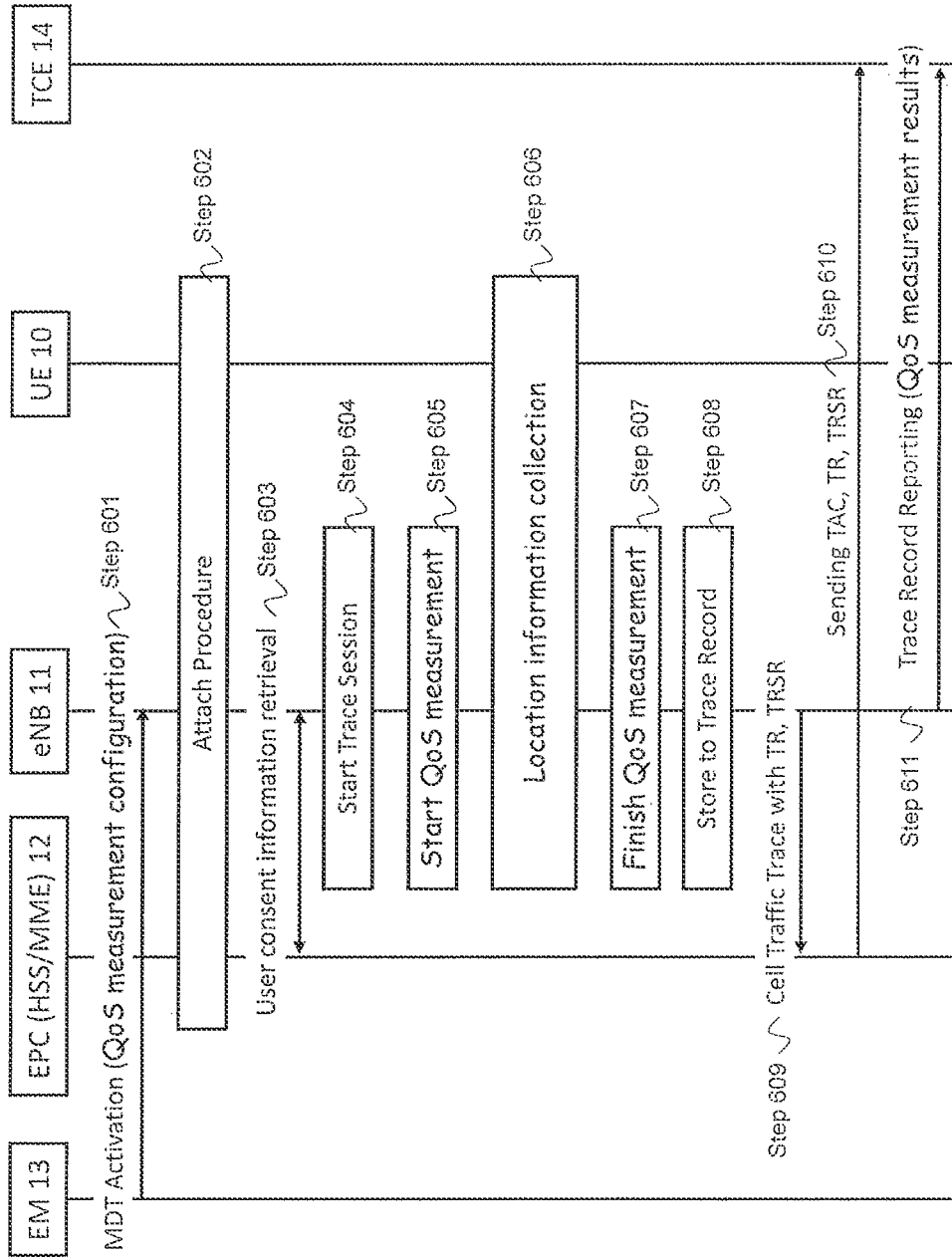
FIG. 12 is a sequence diagram illustrating operations of each node of the first radio communication system in accordance with a sixth embodiment of the present invention.

In the third to the fifth embodiments, the embodiments are described by focusing on the operations of the radio base station (eNB) 11 and the radio terminal (UE) 10 assuming a case of a LTE system. FIG. 12 is a sequence diagram, which includes other network nodes, illustrating operations of each node in accordance with an embodiment of the present invention. Note that, it is assumed that the radio station (eNB) 11 executes quality measurement related to a service quality (e.g. QoS). Also, as a control method of MDT, Management based MDT (also referred to as Area based MDT) is assumed.

In FIG. 12, the network operation management apparatus (EM) 13 notifies the radio base station (eNB) 11 under the control of the EM 13 of a MDT Activation message including configuration information (QoS measurement configuration) of quality measurement related to a service quality (e.g. QoS), in addition to configuration information of the radio terminal (UE) measurement of MDT (MDT measurement configuration), target location information of MDT (Area scope), trace basic information (Trace Reference: TR, Trace Recording Session Reference: TRSR) and the like (Step 601: MDT Activation (QoS measurement configuration)). This configuration information of the quality measurement indicates when, what, how is measured, or how information related to a location is collected from the UE 10, as described from the third embodiment to the fifth embodiment. For example, when there is the UE 10 that performs a connection establishment to the eNB 11 (Step 602: Attach Procedure), the eNB 11 confirms the EPC (HSS) about a user agreement (User Consent) with respect to a report of location information of the UE 10 (Step 603: User consent information retrieval). Note that confirmation of the User consent is performed through each interface from the eNB 11 to the MME, and from the MME to the HSS, but in FIG. 12, it is described as an interface (or message) from the eNB 11 to the EPC (MME/HSS) 12, instead of sequentially indicating an interface (or message) between the eNB 11 and the MME, and an interface (or message) between the MME and the HSS. Note that, in FIG. 12, it is assumed that a user agrees (i.e. Consent) and it is assumed to select the UE 10 of the user as the UE to be instructed to execute Immediate MDT. After starting a trace session (Step 604: Start Trace Session) and performing a MDT preparation, the eNB 11 starts executing quality measurement related to a service quality (e.g. QoS) (Step 605: Start QoS measurement). Note that, it is conceivable that the quality measurement is, for example, throughput, a packet loss rate or a packet discard rate, a packet error rate or a packet retransmission rate, but it is not limited thereto. Then, the eNB 11 collects the information related to a location of the UE 10 to be a target (Step 606: Location information collection). As to a method for collecting the information related to a location of the UE10, it may be the method described in the third embodiment to the fifth embodiment, or the one realized by the present invention other than the ones described in the third embodiment to the fifth embodiment. Note that strictly speaking, it is not necessarily to perform collection during a period of quality measurement, it is conceivable to collect the information before the start of quality measurement, or after the end thereof, or the like. Then, when finishing the quality measurement (Step 607: Finish QoS measurement), the eNB 11 stores the results of the quality measurement and the collected information related to the location of the UE 10 (Step 608: Store to Trace Record). Thereafter, the eNB 11 notifies the EPC (MME) 12 of trace basic information (e.g. TR or TRSR) of which a collection of measurement information is finished (Step 609: Cell Traffic Trace with TR, TRSR). The EPC (MME) 12 reports the information related to the targeted UE 10 to the TCE 14, based on the trace basic information notified from the eNB 11 (Step 610: Sending TAC, TR, TRSR). Then, the eNB 11 reports the measurement information collected in MDT to the TCE (Step 611: Trace Record Reporting (QoS measurement results)).

By the above-operations, when the radio base station (eNB) 11 executes quality measurement related to a service quality (e.g. QoS), it is possible to effectively collect information related to a location of the radio terminal (UE) 10 to be a target for the quality measurement, and to clearly associate the results of the quality measurement with the information related to the location of the radio terminal (UE) 10. Further, this enables the information collection server (TCE) 14, which has collected the results of the quality measurement and the information related to the location of the radio terminal (UE) 10 from the radio base station (eNB) 11, to understand which results of the quality measurement are the results as to where (that is, which location) the radio terminal (UE) 10 stayed, thereby being able to use such information effectively.

Further, in the present invention, the radio base station (eNB) 11 may measure or collect "the radio network information" or "the radio terminal information" described above during a period of quality measurement, and may report such information together with the results of the quality measurement to the information collection server (TCE) 14. Herewith, it is expected to make quality measurement more meaningful.

Note that, in the sixth embodiment of the present invention described above, the example in which the Management based MDT is used is described as a MDT method, but it is obvious to be able to use Signaling based MDT.

<Mode of Second Radio Communication System>

Figure 13:
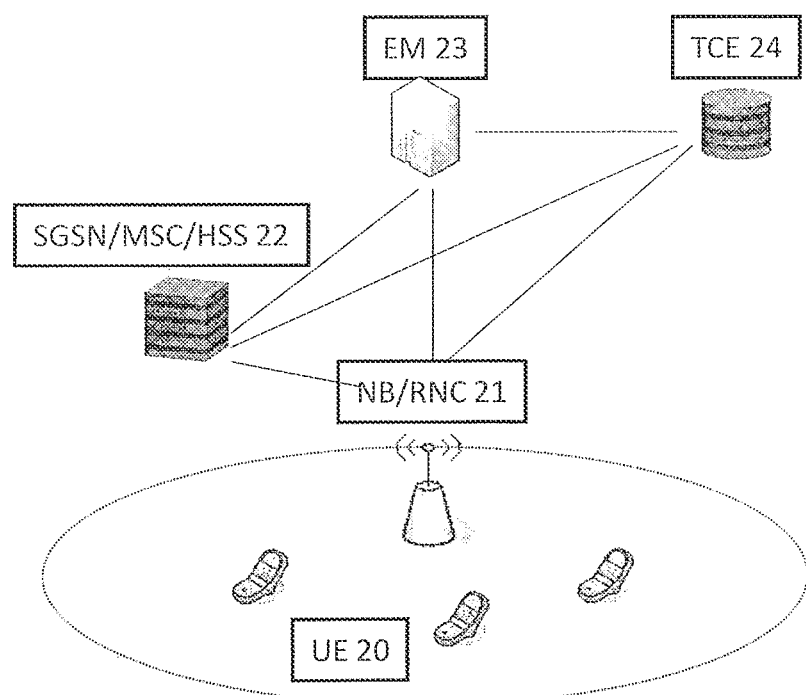
FIG. 13 is a configuration diagram of a second radio communication system applied to the present invention.

FIG. 13 is a diagram illustrating an example of schematic configuration of a radio communication system of another embodiment of the present invention. This second radio communication system assumes a 3GPP UMTS, and includes the radio terminal 20, the radio base station (NB), the base station control station (RNC) (hereinafter, NB/RNC 21), a serving GPRS support node (SGSN) (also referred to as SGSN server), a mobile (communication) exchanger (MSC) (also referred to as MSC server), a home subscriber management server (HSS) (hereinafter, SGSN/MSC/HSS22), the network operation management apparatus (EM) 23, and the information collection server (TCE) 24.

The configuration of a function diagram of the radio terminal (UE) 20 and each radio network node in the second radio communication system is similar to that of those in the first radio communication system, so that the figures will be omitted. Note that the configuration of NB/RNC 21 is similar to the one of the eNB 11 of the first radio communication system, and the configuration of SGSN/MSC/HSS 22 is similar to the one of the MME/HSS 12 of the first radio communication system. There are minor differences such as that a physical interface exists between the NB and the RNC, because the NB and the RNC are basically different nodes. However, there is no much functional difference in application of the present invention.

Seventh Embodiment

Figure 14:
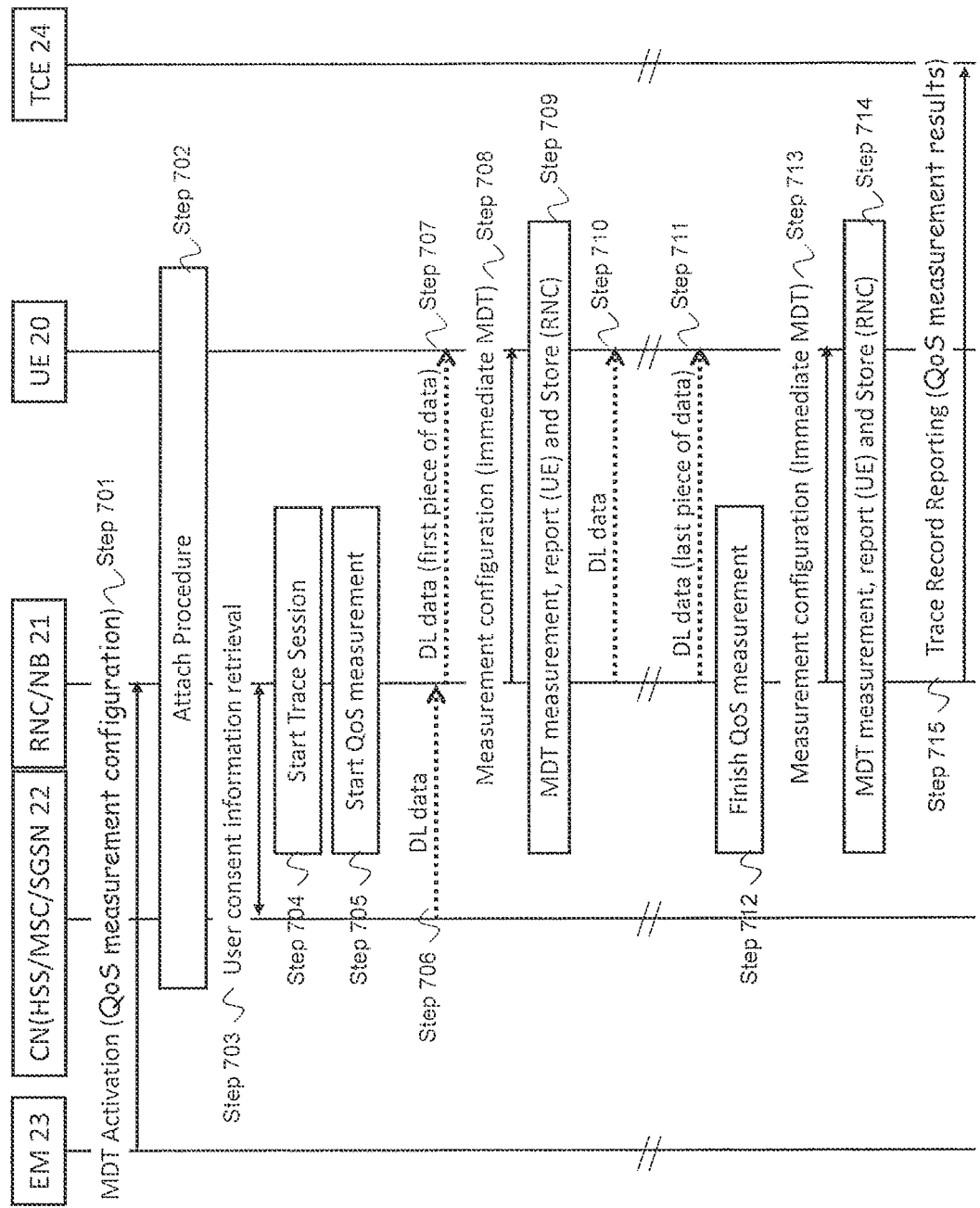
FIG. 14 is a sequence diagram illustrating operations of each node of the second radio communication system in accordance with a seventh embodiment of the present invention.
Figure 15:
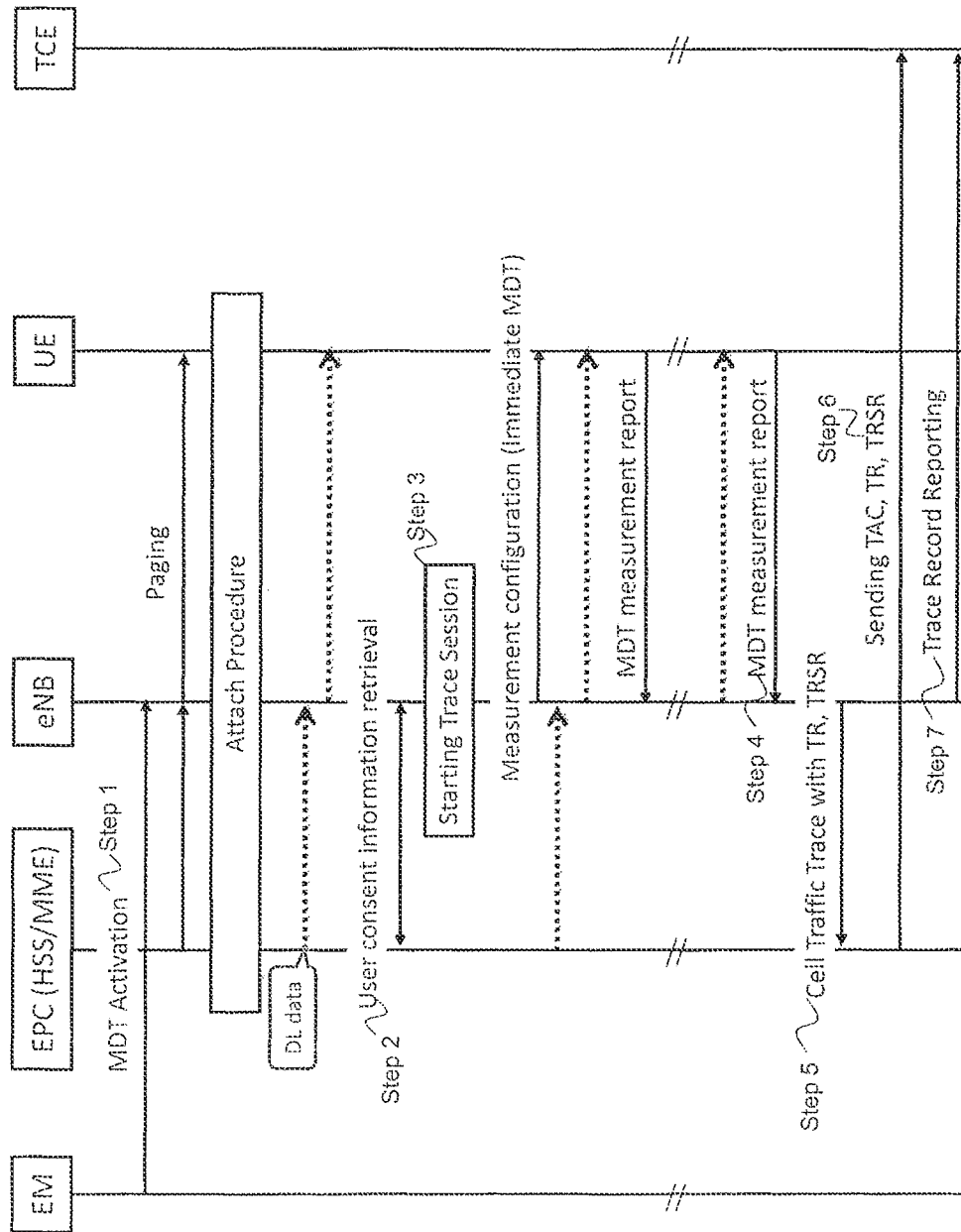
FIG. 15 is a sequence diagram illustrating an example of Immediate MDT in a LTE system related to the present invention.

FIG. 14 is a sequence diagram illustrating operations of each node of UMTS in accordance with a seventh embodiment of the present invention. In the seventh embodiment, it is assumed that the base station control station (RNC) 21 executes quality measurement related to a service quality (e.g. QoS), and executes measurement of downlink throughput as an example of the quality measurement. It is also assumed to collect information related to a location of the radio terminal (UE) 20 at the start and the end of quality measurement. Note that, as a control method of MDT, Management based MDT (also referred to as Area based MDT) is also assumed.

In FIG. 14, the network operation management apparatus (EM) 23 notifies the base station control station (RNC) under the control of the EM 23 of a MDT Activation message including configuration information (QoS measurement configuration) of quality measurement related to a service quality (e.g. QoS), in addition to configuration information of the radio terminal (UE) measurement of MDT (MDT measurement configuration), target location information of MDT (Area scope), trace basic information (Trace Reference: TR, Trace Recording Session Reference: TRSR) and the like (Step 701: MDT Activation (QoS measurement configuration)). In this embodiment, the configuration information of this quality measurement indicates that the RNC 21 performs downlink throughput measurement, the UE 20 obtains information related to a location at the start and the end of throughput measurement and collects such information. For example, when there is the UE 20 that performs a connection establishment to the RNC 21 (Step 702: Attach Procedure), the RNC 21 confirms the CN (SGSN/MSC/HSS22) about a user agreement (User Consent) with respect to a report of location information of the UE 20 (Step 703: User consent information retrieval). Note that confirmation of the User consent is performed through each interface from the RNC 21 to the SGSN or the MSC, and from the SGSN or MSC to the HSS, but in FIG. 14, it is described as an interface (or message) from the RNC 21 to the CN 22 (HSS/SGSN/MSC) instead of sequentially indicating an interface (or message) between the RNC 21 and the SGSN or the MSC, and an interface (or message) between the SGSN or the MSC and the HSS. Note that, in FIG. 14, it is assumed that a user agrees (i.e. Consent) and it is assumed to select the UE 10 of the user as the UE to be instructed to execute Immediate MDT. After starting a trace session (Step 704: Start Trace Session) and performing a MDT preparation, the RNC 21 starts performing throughput measurement related to a service quality (Step 705: Start QoS measurement). On the other hand, the CN 22 (SGSN) arbitrarily transmits downlink data to the RNC 21 (Step 706: DL data), and the RNC 21 transmits the downlink data to the UE 20. Here, when the RNC 21 starts to transmit the first data among the generated (that is, received from the CN 22) downlink data to the UE 20 (Step 707: DL data (first piece of data)), the RNC 21 instructs the UE 20 to execute MDT measurement, obtain the information related to a location, and report i the obtained information (Step 708: Measurement configuration (Immediate MDT)). The UE 20 executes MDT measurement reporting in accordance with the instructions, and the RNC 21 stores MDT measurement information including the reported information related to the location (Step 709: MDT measurement, report (UE) and Store (RNC)). Thereafter, the RNC 21 continues transmission of the downlink data to the UE 20 (Step 710: DL data), and when completing transmission of last data (Step 711: DL data (last piece of data), the RNC 21 calculates throughput values, finishes the quality measurement process (Step 712: Finish of QoS Measurement), and instructs the UE 20 to execute MDT measurement, obtain the information related to the location, and report the obtained information (Step 713: Measurement configuration (Immediate MDT)). The UE 20 executes the MDT measurement in accordance with the instructions, and the RNC 21 stores the MDT measurement information including the reported information related to the location (Step 714: MDT measurement, report (UE) and Store (RNC)). Then, the RNC 21 reports the measurement information collected in MDT to the TCE 24 (Step 715: Trace Record Reporting (QoS measurement results)).

By the above-operations, when the base station control station (RNC) 21 executes quality measurement related to a service quality (e.g. QoS), it is possible to effectively collect information related to a location of the radio terminal (UE) 20 to be a target for the quality measurement, and to clearly associate the results of the quality measurement with the information related to the location of the radio terminal (UE) 20. Further, this enables the information collection server (TCE) 24, which has collected the results of the quality measurement and the information related to the location of the radio terminal (UE) 20 from the base station control station (RNC) 21, to understand which results of the quality measurement are the results as to where (that is, which location) the radio terminal (UE) 20 stayed, thereby being able to use such information effectively.

Further, in the present invention, the base station control station (RNC) 21 may measure or collect "the radio network information" or "the radio terminal information" described above during a period of quality measurement, and may report such information together with the results of the quality measurement to the information collection server (TCE) 24. Herewith, it is expected to make quality measurement more meaningful.

Note that, in the seventh embodiment of the present invention described above, the example in which the Management based MDT is used is described as a MDT method, but it is obvious to be able to use Signaling based MDT as well. Similarly, the UE in a RRC_Connected state may perform Logged MDT by instead of Immediate MDT.

In the above-described embodiments, 3GPP LTE or UMTS is assumed as a radio communication system, however, the present invention is not limited thereto, it is possible to be applied to GSM (Global System for Mobile communications), WIMAX (Worldwide interoperability for Microwave Access), and the like.

As is apparent from the above-descriptions, each unit may be configured with hardware or may be realized by a computer program. In this case, the functions and operations similar to each embodiment described above are realized by a processor under a program stored in a program memory. Only one part of the above-described functions of the embodiments can be realized with the computer program.

One part or an entirety of the above embodiments can be described as the following supplementary notes, but the present invention is not limited to the followings.

(Supplementary Note 1) A radio communication system having quality measurement means configured to execute quality measurement related to a service quality in communication between a radio terminal and a radio station, and information collection means configured to collect information related to a location of the radio terminal to a target for the quality measurement, the radio communication system comprising:

means configured to associate the information related to the location of the radio terminal when a predetermined condition is satisfied in an execution period of the quality measurement with results of the quality measurement.

(Supplementary Note 2) The radio communication system according to supplementary note 1, wherein the predetermined condition is at least either one of the start and the end of the quality measurement.

(Supplementary Note 3) The radio communication system according to supplementary note 1 or 2, wherein the predetermined condition is the start and the end of the quality measurement.

(Supplementary Note 4) The radio communication system according to any of supplementary notes 1 to 3, wherein the radio station has means configured to instruct the radio terminal to be a target for the quality measurement to obtain one or more than one the information related to the location.

(Supplementary Note 5) The radio communication system according to any of supplementary notes 2 to 4, wherein the start of the quality measurement is any of the start of a session to be a target for the quality measurement, the transmission of first data in a session to be a target for the quality measurement, the reception of first data in a session to be a target for the quality measurement, a time point that data belonging to a predetermined QoS (Quality of Service) in a session to be a target for the quality measurement is generated, the transmission of data belonging to a predetermined QoS in a session to be a target for the quality measurement, a time point that data is generated in a predetermined LCG (Logical Channel Group) in a session to be a target for the quality measurement, and the transmission of data of a predetermined LCG in a session to be a target for the quality measurement.

(Supplementary Note 6) The radio communication system according to any of supplementary notes 2 to 5, wherein the end of the quality measurement is any of the end of a session to be a target for the quality measurement, the decision of end of a session to be a target for the quality measurement, the transmission of last data in a session to be a target for the quality measurement, the reception of last data in a session to be a target for the quality measurement, the completion of transmitting last data in a session to be a target for the quality measurement, the completion of receiving last data in a session to be a target for the quality measurement, a time point that data belonging to a predetermined QoS in a session to be a target for the quality measurement is empty, and a time point that data of a predetermined LCG in a session to be a target for the quality measurement is empty.

(Supplementary Note 7) The radio communication system according to any of supplementary notes 1 to 6, wherein the predetermined condition is a predetermined period from when the predetermined condition is received, and the information related to the location is obtained at the predetermined period and reported to the radio station.

(Supplementary Note 8) The radio communication system according to any of supplementary notes 1 to 6, wherein the predetermined condition is a predetermined period from when the predetermined condition is received, and the information related to the location is obtained at the predetermined period and the obtained information related to the location is reported to the radio station at a predetermined timing.

(Supplementary Note 9) The radio communication system according to supplementary note 8, wherein the radio terminal reports the information related to the location, either when a distance for which the radio terminal moves from a previous report of the information related to the location is more than a predetermined value, or when the radio terminal receives more than the predetermined number of packets.

(Supplementary Note 10) The radio communication system according to supplementary note 8 or 9, wherein the predetermined timing is at least any of the start of the quality measurement, the end of the quality measurement, the start of a session to be a target for the quality measurement, the start of transmission and reception of data to be a target for the quality measurement, the end of a session to be a target for the quality measurement, the end of transmission and reception of data to be a target for the quality measurement, and when instructions for reporting the information related to the location are received from the radio station.

(Supplementary Note 11) The radio communication system according to any of supplementary notes 1 to 10, wherein the predetermined condition is that the radio terminal obtains or updates detailed location information.

(Supplementary Note 12) The radio communication system according to any of supplementary notes 1 to 11, wherein the radio station instructs the radio terminal to obtain the detailed location information.

(Supplementary Note 13) The radio communication system according to any of supplementary notes 1 to 12, wherein the predetermined condition is to satisfy a preliminary indicated condition related to a measurement report of received quality, or to transmit or receive handover instructions.

(Supplementary Note 14) The radio communication system according to any of supplementary notes 1 to 13, wherein when the radio terminal to be a target for the quality measurement performs handover, the radio station reports results of the quality measurement up to an initiation of the handover, or invalid values, together with information indicating a disruption caused by the handover, to an information collection server.

(Supplementary Note 15) The radio communication system according to any of supplementary notes 1 to 14, wherein when a call disconnection occurs in the radio terminal to be a target for the quality measurement, the radio station reports results of the quality measurement up to an initiation of the call disconnection (RLF), or invalid values, together with information indicating a disruption caused by the call disconnection, to the information collection server.

(Supplementary Note 16) The radio communication system according to any of supplementary notes 1 to 15, wherein the radio station reports to the information collection server, the information related to the location collected from the radio terminal and results of the quality measurement as one QoS information element.

(Supplementary Note 17) The radio communication system according to any of supplementary note 16, wherein the QoS information element includes at least one of terminal unique information, core network load information, radio access network load information, speed related information of the radio terminal, radio bearer related information of the radio terminal, and radio link information.

(Supplementary Note 18) The radio communication system according to any of supplementary notes 1 to 17, wherein the radio station receives instructions from an upper network node to execute the quality measurement related to a service quality, and collects the information related to a location of the radio terminal to be a target for the quality measurement.

(Supplementary Note 19) The radio communication system according to any of supplementary notes 1 to 17, wherein the radio terminal receives instructions from the radio station, and executes the quality measurement related to a service quality.

(Supplementary Note 20) The radio communication system according to any of supplementary notes 1 to 19, wherein the radio station decides whether the predetermined condition is satisfied, and instructs the radio terminal to be a target for the quality measurement to obtain one or more than one the information related to the location.

(Supplementary Note 21) The radio communication system according to any of supplementary notes 1 to 19, wherein the radio terminal decides whether the predetermined condition is satisfied, and obtains the information related to the location.

(Supplementary Note 22) A radio terminal in a radio communication system that executes quality measurement related to a service quality in communication between the radio terminal and a radio station, the radio terminal comprising:

location information report means configured to obtain information related to the radio terminal when a predetermined condition is satisfied in an execution period of the quality measurement, and report the obtained information related to the location to the radio station.

(Supplementary Note 23) The radio terminal according to supplementary note 22, wherein the predetermined condition is at least either one of the start and the end of the quality measurement.

(Supplementary Note 24) The radio terminal according to supplementary note 22 or 23, wherein the predetermined condition is the start and the end of the quality measurement.

(Supplementary Note 25) The radio terminal according to any of supplementary notes 22 to 24, wherein the location information report means is configured to receive instructions to obtain one or more than one the information related to the location, and obtain one or more than one the information related to the location.

(Supplementary Note 26) The radio terminal according to any of supplementary notes 23 to 25, wherein the start of the quality measurement is any of the start of a session to be a target for the quality measurement, the transmission of first data in a session to be a target for the quality measurement, the reception of first data in a session to be a target for the quality measurement, a time point that data belonging to a predetermined QoS (Quality of Service) in a session to be a target for the quality measurement is generated, the transmission of data belonging to a predetermined QoS in a session to be a target for quality measurement, a time point that data is generated in a predetermined LCG (Logical Channel Group) in a session to be a target for the quality measurement, and the transmission of data of a predetermined LCG in a session to be a target for the quality measurement.

(Supplementary Note 27) The radio terminal according to any of supplementary notes 23 to 26, wherein the end of the quality measurement is any of the end of a session to be a target for the quality measurement, the decision of end of a session to be a target for the quality measurement, the transmission of last data in a session to be a target for the quality measurement, the reception of last data in a session to be a target for the quality measurement, the completion of transmitting last data in a session to be a target for the quality measurement, the completion of receiving last data in a session to be a target for the quality measurement, a time point that data belonging to a predetermined QoS in a session to be a target for the quality measurement is empty, and a time point that data of a predetermined LCG in a session to be a target for the quality measurement is empty.

(Supplementary Note 28) The radio terminal according to any of supplementary notes 22 to 27, wherein the predetermined condition is a predetermined period from when the predetermined condition is received, and the location information report means is configured to obtain the information related to the location at the predetermined period, and report the obtained information to the radio station.

(Supplementary Note 29) The radio terminal according to any of supplementary notes 22 to 27, wherein the predetermined condition is a predetermined period from when the predetermined condition is received, and the location information report means is configured to obtain the information related to the location at the predetermined period, and report the obtained information related to the location to the radio station at a predetermined timing.

(Supplementary Note 30) The radio terminal according to supplementary note 29, wherein the location information report means is configured to report the information related to the location, either when a distance for which the radio terminal moves from a previous report of the information related to the location is more than a predetermined value, or when the radio terminal receives more than the predetermined number of packets.

(Supplementary Note 31) The radio terminal according to supplementary note 29 or 30, wherein the predetermined timing is at least any of the start of the quality measurement, the end of the quality measurement, the start of a session to be a target for the quality measurement, the start of transmission and reception of data to be a target for the quality measurement, the end of a session to be a target for the quality measurement, the end of transmission and reception of data to be a target for the quality measurement, and when instructions for reporting the information related to the location are received from the radio station.

(Supplementary Note 32) The radio terminal according to any of supplementary notes 22 to 31, wherein the predetermined condition is that the radio terminal obtains or updates detailed location information.

(Supplementary Note 33) The radio terminal according to any of supplementary notes 22 to 32, further comprising receiving instructions to obtain the detailed location information.

(Supplementary Note 34) The radio terminal according to any of supplementary notes 22 to 33, wherein the predetermined condition is to satisfy a preliminary indicated condition related to a measurement report of received quality, or to transmit or receive handover instructions.

(Supplementary Note 35) The radio terminal according to any of supplementary notes 22 to 34, wherein the location information report means is configured to obtain the information related to the location based on the instructions from the radio station, the instructions to be transmitted when the radio station decides that the predetermined condition is satisfied.

(Supplementary Note 36) The radio terminal according to any of supplementary notes 22 to 34, wherein the location information report means is configured to decide whether the predetermined condition is satisfied, and obtain the information related to the location.

(Supplementary Note 37) The radio terminal according to any of supplementary notes 22 to 36, further comprising means configured to receive the instructions from the radio station, and execute the quality measurement related to the service quality.

(Supplementary Note 38) A radio station in a radio communication system that executes quality measurement related to a service quality in communication between a radio terminal and the radio station, the radio station comprising:

means configured to instruct the radio terminal to be a target for the quality measurement to obtain one or more than one information related to a location when a predetermined condition is satisfied; and means configured to associate the information related to the location of the radio terminal with results of the quality measurement.

(Supplementary Note 39) A network operation management apparatus in a radio communication system that executes quality measurement related to a service quality in communication between a radio terminal and a radio station, the network operation management apparatus comprising:

means configured to instruct the radio station to execute the quality measurement;

instruct the radio terminal to be a target for the quality measurement to obtain one or more than one information related to a location when a predetermined condition is satisfied, in an execution period of the quality measurement; and transmit the information related to the location of the radio terminal in association with results of the quality measurement.

(Supplementary Note 40) A communication quality confirmation method, comprising:

executing quality measurement related to a service quality in communication between a radio terminal and a radio station;

obtaining information related to a location of the radio terminal when a predetermined condition is satisfied; and associating the information related to the location of the radio terminal when the predetermined condition is satisfied with results of the quality measurement.

Above, while the present invention has been particularly shown and described with reference to embodiments and exemplary embodiment, the present invention is not limited to the above mentioned embodiments and exemplary embodiments. It will be understood by those of ordinary skill in the art that various changes in form and details may be made therein without departing from the spirit and scope of the present invention. In addition, an appropriate combination of the embodiments or exemplary embodiments may be employed.

This application is based upon and claims the benefit of priority from Japanese patent application No. 2012-9486, filed on Jan. 19, 2012, the disclosure of which is incorporated herein in its entirety by reference.

REFERENCE SIGNS LIST

1 Radio station
2 Radio terminal
10 Radio terminal (UE)
11 Radio base station (eNB)
12 Mobility management apparatus (MME)/Home subscriber management server (HSS)

13 Network operation management apparatus (EM)
14 Information collection server (Trace Collection Entity: TCE)
20 Radio terminal (UE)
21 Base station control station (RNC)
22 Home subscriber management server (HSS)
23 Network operation management apparatus (EM)
24 Information collection server (TCE)

The invention claimed is:

1. A radio communication system having at least a radio terminal and a radio station,
wherein the radio station comprises:
a first transmitter configured to transmit an instruction for the radio terminal to periodically obtain information related to a location of the radio terminal;
at least one processor configured to:
perform throughput measurement of a communication with the radio terminal, in a predetermined execution period, and
collect, as collected information, the information related to the location of the radio terminal, information of an accuracy of the information related to the location of the radio terminal, results of the throughput measurement, information related to a time at which the throughput measurement is performed by the radio station, and a quality of service (QoS) class indicator related to the throughput measurement; and
a second transmitter configured to transmit the collected information to an information collection apparatus,
wherein the collected information is correlated based on the time at which the throughput measurement is performed by the radio station in the predetermined execution period,
wherein the radio terminal comprises:
at least one processor configured to obtain the information related to the location of the radio terminal and information of an accuracy of the information related to the location of the radio terminal, in response to the instruction; and
a terminal transmitter configured to report the obtained information related to the location of the radio terminal and information of an accuracy of the information related to the location of the radio terminal.

2. The radio communication system according to claim 1, wherein the instruction for the radio terminal to obtain the information comprises an instruction for the radio terminal to use a Global Navigation Satellite System (GNSS) to obtain the information.

3. A radio station comprising:
a first transmitter configured to transmit an instruction for a radio terminal to periodically obtain information related to a location of the radio terminal;
at least one processor configured to perform throughput measurement of a communication with the radio terminal, in a predetermined execution period; and
a second transmitter configured to transmit collected information comprising the information related to the location of the radio terminal, information of an accuracy of the information related to the location of the radio terminal, results of the throughput measurement, information related to a time at which the throughput measurement is performed by the radio station, and a quality of service (QoS) class indicator related to the throughput measurement, the collected information being correlated based on the time at which the throughput measurement is performed by the radio station in the predetermined execution period.

4. The radio station according to claim 3, wherein the processor is further configured to collect the collected information.

5. The radio station according to claim 3, wherein the instruction for the radio terminal to obtain the information comprises an instruction for the radio terminal to use a Global Navigation Satellite System (GNSS) to obtain the information.

6. The radio station according to claim 3, wherein the radio station is one of a base station and a Radio Network Controller (RNC), and the information collection apparatus is a Trace Collection Entity (TCE).

7. The radio station according to claim 3, wherein the throughput is an uplink throughput from the radio terminal to the radio station.

8. The radio station according to claim 3, wherein the throughput measurement is not performed by the radio terminal.

9. A network operation management system in a radio communication system, comprising:
at least one memory storing instructions; and
at least one processor configured to execute the instructions to:
instruct a radio station to perform throughput measurement of a communication with a radio terminal, and to report collected information comprising: the information related to a location of the radio terminal, information of an accuracy of the information related to the location of the radio terminal, results of the throughput measurement, information related to a time at which the throughput measurement is performed by the radio station, and a quality of service (QoS) class indicator related to the throughput measurement; and
receive, from the radio station, the collected information, the collected information being correlated based on the time at which the throughput measurement is performed by the radio station in the predetermined execution period, wherein
the radio station is configured to transmit an instruction for the radio terminal to periodically obtain the information related to the location.

10. The network operation management system according to claim 9, wherein the instruction for the radio terminal to obtain the information comprises an instruction for the radio terminal to use a Global Navigation Satellite System (GNSS) to obtain the information.

11. A communication method in a radio station, comprising:
transmitting an instruction for a radio terminal to periodically obtain information related to a location of the radio terminal;
performing throughput measurement of a communication with the radio terminal in a predetermined execution period;
collecting, as collected information, the information related to the location of the radio terminal, information of an accuracy of the information related to the location of the radio terminal, results of the throughput measurement, information related to a time at which the throughput measurement is performed by the radio station, and a quality of service (QoS) class indicator related to the throughput measurement; and
transmitting the collected information to an information collection apparatus, wherein the collected information is correlated based on the time at which the throughput measurement is performed by the radio station in the predetermined execution period.

12. The communication method according to claim 11, further comprising:
collecting the collected information.

13. The communication method in the radio station according to claim 11, wherein the radio station is one of a base station and a Radio Network Controller (RNC), and the information collection apparatus is a Trace Collection Entity (TCE).

14. The communication method in the radio station according to claim 11, wherein the throughput is an uplink throughput from the radio terminal to the radio station.

15. The communication method in the radio station according to claim 11, wherein the throughput measurement is not performed by the radio terminal.

16. A communication method in a network operation management system, comprising:
instructing a radio station:
to perform throughput measurement of a communication with a radio terminal, wherein the radio station transmits an instruction for the radio terminal to periodically obtain the information related to the location of the radio terminal, and
to report, to an information collection apparatus, collected information comprising the information related to a location of the radio terminal, information of an accuracy of the information related to the location of the radio terminal, results of the throughput measurement, information related to a time at which the throughput measurement is performed by the radio station, and a quality of service (QoS) class indicator related to the throughput measurement; and
receiving, from the radio station, the collected information,
wherein the collected information is correlated based on the time at which the throughput measurement is performed by the radio station in the predetermined execution period.

* * * * *